United States Patent
Leizerovich et al.

(10) Patent No.: US 10,366,586 B1
(45) Date of Patent: Jul. 30, 2019

(54) VIDEO ANALYSIS-BASED THREAT DETECTION METHODS AND SYSTEMS

(71) Applicant: 360fly, Inc., Fort Lauderdale, FL (US)

(72) Inventors: Gustavo D. Leizerovich, Aventura, FL (US); Kolja S. Hegelich, Dorsten (DE); Ralf Niebecker, Parkland, FL (US)

(*) Notice: Subject to any disclaimer, the term of this patent is extended or adjusted under 35 U.S.C. 154(b) by 0 days.

(21) Appl. No.: 15/981,838

(22) Filed: May 16, 2018

(51) Int. Cl.
G08B 13/00 (2006.01)
G08B 13/196 (2006.01)
G06K 9/00 (2006.01)
G06N 20/00 (2019.01)

(52) U.S. Cl.
CPC ... G08B 13/19608 (2013.01); G06K 9/00342 (2013.01); G06N 20/00 (2019.01); G08B 13/19613 (2013.01); G08B 13/19632 (2013.01); G08B 13/19645 (2013.01); G08B 13/19647 (2013.01)

(58) Field of Classification Search
CPC ........ G08B 13/19608; G08B 13/19613; G08B 13/19632; G08B 13/19645; G08B 13/19647; G06N 20/00; G06K 9/00342
USPC .......................................................... 340/541
See application file for complete search history.

(56) References Cited

U.S. PATENT DOCUMENTS

| | | | | |
|---|---|---|---|---|
| 2002/0196330 A1* | 12/2002 | Park | ................ | G08B 13/19608 348/49 |
| 2005/0104961 A1* | 5/2005 | Han | ................ | G08B 13/19604 348/143 |
| 2006/0243798 A1* | 11/2006 | Kundu | ................... | G06Q 20/00 235/383 |
| 2008/0208828 A1* | 8/2008 | Boiman | ............. | G06K 9/00342 |
| 2012/0169882 A1* | 7/2012 | Millar | .................... | H04N 7/181 348/159 |
| 2014/0063239 A1* | 3/2014 | Furness, III | ........... | G01N 21/31 348/143 |
| 2014/0371599 A1* | 12/2014 | Wu | ...................... | A61B 5/0077 600/476 |
| 2015/0356840 A1* | 12/2015 | Wang | ............... | G08B 13/19682 382/103 |
| 2016/0344918 A1* | 11/2016 | Tao | ..................... | H04N 5/23206 |
| 2018/0300557 A1* | 10/2018 | Rodenas | ............ | G06K 9/00771 |
| 2018/0322749 A1* | 11/2018 | Kempel | ........... | G08B 13/19608 |

* cited by examiner

*Primary Examiner* — Naomi J Small
(74) *Attorney, Agent, or Firm* — Daniel C. Crilly; Mansour Ghomeshi

(57) ABSTRACT

Threat detection methods and systems serve to alert persons of potential dangers. According to one exemplary method, a video processing system (VPS) receives video data in real time or near real time from at least one camera positioned to capture images of a video capture area proximate a person. The video data includes data representing a series of time-sequenced video frames. The VPS determines whether data representing a first video frame includes data representative of one or more predefined patterns. If so, the VPS commences tracking of the predefined pattern(s) within the video data to produce one or more tracked patterns. After pattern tracking has begun, the VPS determines whether data representing one or more subsequent video frames includes data representative of the tracked pattern(s). If so, the VPS determines whether the tracked pattern(s) is/are positioned suspiciously relative to a position of the person and, if so, alerts the person.

30 Claims, 8 Drawing Sheets

VIDEO ANALYSIS-BASED THREAT DETECTION METHODS AND SYSTEMS

TECHNICAL FIELD

The present disclosure relates generally to video-based security systems and, more particularly, to methods and systems for detecting threats to persons using real-time or near real-time video data analysis.

BACKGROUND

Mobile and fixed video surveillance systems are well known. Such systems are regularly utilized for a variety of reasons, including to monitor the activities and surroundings of employees of package delivery service companies and cash transport service companies, as well as to monitor activities within banks and stores, and at automated teller machines (ATMs). Most existing surveillance systems record video over a period of time and then store the video to a separate external memory device or to internal memory for later viewing. Where memory for storing surveillance video is limited in size, such memory may become full prior to storing new video or during the storage of new video. In such a case, the new video may be stored by overwriting the oldest stored video, such that video data for a most recent chosen time period is always stored in memory for later viewing.

Some business and government video surveillance systems, such as those in casinos or prisons, are monitored in real time by employees or contractors of the business or government. Such systems are costly to operate due to the need for regular or continual human interaction.

Other video surveillance systems are not configured to facilitate real-time human monitoring and instead store video for later viewing as discussed above. Few, if any, of those video surveillance systems perform real-time or near real-time object tracking and automated threat notification based thereon.

SUMMARY

Generally, the present disclosure relates to video processing-based methods and systems for detecting a threat to a person, such as, but not limited to, a package delivery service employee or a cash management service employee. Such methods and systems eliminate the need for real-time human video monitoring in order to alert a person under surveillance of a potential threat. Instead, the systems and methods disclosed herein are fully automated and software-driven.

According to one exemplary method, a video processing system receives video data in real time or near real time from at least one camera. "Near real time" takes into account transmission delays inherent in the communication network or networks over which the video data is communicated from the camera(s) to the video processing system. The camera or cameras may be secured to the person's body (e.g., on the person's shoulder or back), to a vehicle near the person (e.g., a vehicle that may have transported the person to his or her current location), to a building near the person, and/or to or within some other object near the person (e.g., an automated teller machine (ATM), a light pole, a tree, a storefront, or any other object). The one or more cameras capture images of a video capture area proximate the person. The received video data includes data representing a plurality of time-sequenced video frames. To control delivery of the video data in real time or near real time from multiple cameras, the video processing system may execute a real-time streaming control protocol, such as version 2.0 of the Real Time Streaming Protocol (RSTP 2.0) or any successor thereof as standardized by the Internet Engineering Task Force (IETF). To receive the video data from any particular camera, the video processing system may execute a real-time transport protocol and a real-time streaming protocol, such as the Real-Time Transport Protocol (RTP) and the Real-Time Messaging Protocol (RTMP) or any successor or substitute protocols as also standardized by the IETF or another standards body.

Responsive to receiving the video data, the video processing system determines whether data representing a video frame includes data representative of one or more predefined patterns. For example, according to an exemplary embodiment, the video processing system may compare the video frame data to previously stored data representative of one or more predefined patterns, such as a set of potential threat patterns. A set of potential threat patterns may include, for example, the outline or other features of a human body or a portion thereof, the outline or other features of one or more predetermined objects (such as a firearm, knife, bat, club, TASER, or other object that could be used as a weapon), and/or the outline or other features of a vehicle. The video processing system may be programmed to update and/or expand the stored threat pattern data by applying machine learning techniques, such as supervised learning techniques (e.g., classification and/or regression algorithms), unsupervised learning techniques (e.g., association, clustering, and/or dimensionality reduction algorithms), and/or reinforcement learning techniques, to video data received by the video processing system over time.

When the video processing system has determined that at least a portion of the video frame data includes data substantially similar to stored data representative of one or more potential threat patterns, the video processing system may determine that the video frame data includes threat pattern data or other predefined pattern data. As one example, the video processing system may find potential threat patterns within the video frame data by extracting feature representations of the video frame data and comparing the extracted features to predefined feature representations of stored patterns. Feature representations may be extracted from video frame data through use of a computer vision algorithm, such as an edge detection algorithm, and/or an artificial intelligence algorithm, such as a convolutional neural network.

When the video processing system has determined that at least a portion of the video frame data includes data representative of one or more predefined patterns, the video processing system may commence tracking of such pattern or patterns within the video data. Pattern tracking may be performed on a video frame-by-video frame basis or on any other periodic or aperiodic basis (e.g., every other video frame, every fifth video frame, every third video frame during daylight hours, but every video frame during nighttime hours, and so forth). According to one exemplary embodiment, the video processing system may define a bounding area for each tracked pattern and initiate tracking to monitor for changes to the tracked pattern bounding area over time, especially within the video capture area. For example, once a tracked pattern is detected in video data representing a video frame, the video processing system may position a virtual square, rectangle, oval, triangle, or other predetermined geometric shape around the tracked pattern to form a trackable area for purposes of reducing the amount of processing resources necessary to track the pattern and its positioning relative to the person under surveillance. In other words, when a particular predefined pattern has been detected within a video frame, the pattern may be "bounded" within a predefined or adaptive virtual area to make evaluating the pattern's positioning over multiple video frames and the potential threat to the person under surveillance less processing intensive.

Pattern tracking may be commenced immediately upon detecting that video frame data includes data representative of one or more predefined patterns or such tracking may be commenced selectively, such as only when certain other conditions are met. For example, the video processing system may use characteristics of the bounding area as a basis for deciding whether or not to initiate and perform pattern tracking. In such a case, the bounding area characteristics based upon which the video processing system may decide to initiate and perform pattern tracking include the size of the bounding area and/or the proximity of one or more points within the bounding area or on one or more of its edges to a location of the person under surveillance. For example, the video processing system may determine a location of the tracked pattern bounding area (e.g., within or along the edge the tracked pattern bounding area) relative to a location of the person under surveillance and selectively initiate pattern tracking only when the location of the tracked pattern bounding area is estimated to be within a threshold distance (e.g., within about 45 feet or 14 meters) of the location of the person under surveillance. Alternatively or additionally, the video processing system may use characteristics of the detected pattern or patterns to decide whether or not to initiate and perform pattern tracking. For example, the video processing system may determine to initiate pattern tracking only when data representative of a minimum quantity of patterns or data representative of a particular type of pattern has been determined to be present in the video frame data at a given time.

After pattern tracking has been commenced, the video processing system determines whether data representing one or more subsequent video frames includes data representative of the tracked pattern or patterns. In other words, after pattern tracking has commenced, the video processing system analyzes some or all of the data representing video frames subsequent in time to the video frame that triggered the tracking to determine whether such data includes any tracked pattern or patterns. Such analysis may include comparing some or all of the video data representative of a subsequent video frame to previously stored data representative of one or more predefined patterns or comparing some or all of the video data representative of a subsequent video frame to data representative of a pattern detected in a prior video frame. According to one exemplary embodiment, the video processing system analyzes video frame data on a periodic basis after pattern tracking has commenced. For example, the video processing system may analyze data representing ten consecutive video frames where the camera supplying the video data is capturing images at a rate of thirty frames per second (30 fps). In such a case, the video processing system analyzes every 333 milliseconds of video data to determine whether such data includes the tracked pattern(s) after pattern tracking has commenced. As another example, the video processing system may analyze data representing fifteen consecutive video frames where the camera supplying the video data is capturing images at a rate of sixty frames per second (60 fps). In this particular case, the video processing system may analyze every 250 milliseconds of video data to determine whether such data includes the tracked pattern(s) after pattern tracking has been commenced. The quantity of video frames analyzed by the video processing system may be selected based on several factors, including camera video quality, location and/or size of the video capture area, positioning of the person within the video capture area, quantity and type of physical and natural structures in or near the video capture area, and so forth.

When data representing one or more subsequent video frames includes data representative of the tracked pattern or patterns, the video processing system determines, based on the analyzed data and the data representative of the tracked pattern or patterns, whether the tracked pattern or patterns are positioned suspiciously relative to a position of the person under surveillance. According to one exemplary embodiment, the video processing system may determine whether the analyzed data includes data indicative of movement of the tracked pattern or patterns in a potentially threatening manner relative to the person. For example, the video processing system may compare data representative of one or more tracked patterns in one subsequent video frame to data representative of the same tracked pattern or patterns in another subsequent video frame on a video frame-by-video frame basis. Based on such comparison, the video processing system may determine a motion vector for each tracked pattern, which represents movement of the tracked pattern over time. When the motion vector is determined to be in the general direction of the person under surveillance (e.g., when the motion vector projects movement of a tracked pattern to within about 45 feet or 14 meters of the person under surveillance), the video processing system may determine that the video data representing the subsequent video frames includes data indicative of movement of the one or more tracked patterns in a potentially threatening manner relative to the person.

According to another exemplary embodiment, the video processing system may compare data representative of the one or more tracked patterns in one set of subsequent video frames to data representative of the one or more tracked patterns in another, later-in-time set of subsequent video frames. Responsive to such comparison, the video processing system may determine one or more motion vectors that represent movement of the one or more tracked patterns over time. Thereafter, the video processing system may determine, based on the motion vector or vectors, whether a tracked pattern is moving generally toward the person under surveillance. When a tracked pattern is moving generally toward the person under surveillance (e.g., moving directly toward the person or toward a position that is close enough to the person to pose a threat to the person depending on, for example, the details of the tracked pattern, or moving on a path that will, with a high probability, intersect with or be in close proximity to a path of the person), the video processing system may determine a distance between the tracked pattern and the person. When the determined distance is less than threshold, the video processing system may determine that video data representing the one or more subsequent video frames includes data indicative of movement of the one or more tracked patterns in a potentially threatening manner relative to the person under surveillance.

According to another exemplary embodiment, the video processing system may receive motion data associated with the person under surveillance, where the motion data is time-synchronized with the video data. The motion data may be received from a camera secured to the body of the person, such as from one or more motion sensors (e.g., accelerometer, gyroscope, global positioning system (GPS), or other sensors) embedded within the camera, or from a mobile device carried by the person surveillance (e.g., from a smartphone running a mobile application that is time-synchronized with the person's body camera). Where the motion data is supplied by the person's body camera, the motion data may be received by the video processing system as metadata within the video data stream from the camera.

Where motion data for the person is received in addition to video data, the video processing system may use the motion data to assist with determining whether one or more tracked patterns are positioned suspiciously relative to the person under surveillance. In such a case, when the video processing system determines that the person under surveillance is in motion, the video processing system may further determine, based on video data over multiple video frames, whether one or more tracked patterns are becoming substantially smaller in size (e.g., at least twenty-five percent smaller over one or more video frames) or are no longer present in the video capture area. When the person under surveillance is in motion and the one or more tracked patterns are not becoming substantially smaller in size and/or remain present in the video capture area, the video processing system may determine that the one or more tracked patterns are positioned suspiciously relative to the position of the person. Alternatively, when the person under surveillance is in motion and the one or more tracked patterns are becoming substantially smaller in size or are no longer present in the video capture area, the video processing system may determine that the one or more tracked patterns are not positioned suspiciously relative to the position of the person.

According to another exemplary embodiment in which a tracked pattern bounding area is defined for each tracked pattern, the video processing system may make use of the tracked pattern bounding area or areas to determine whether the tracked pattern or patterns are positioned suspiciously relative to a position of the person. For example, according to one exemplary embodiment, the video processing system may set the position of the person under surveillance as a reference origin for the images captured by one or more of the cameras (e.g., a camera secured to a body of the person under surveillance). In such a case, the video processing system may determine whether the tracked pattern bounding area is becoming larger and/or closer to a bottom of each image in subsequent video frames based upon received data representing the subsequent video frames. When the tracked pattern bounding area is becoming larger and/or closer to a bottom of each image in the subsequent video frames, the video processing system may determine that the tracked pattern is positioned suspiciously relative to the position of the person.

To determine whether the tracked pattern bounding area is becoming larger in the subsequent video frames, the video processing system may, according to one exemplary embodiment, determine a size of the tracked pattern bounding area in each video frame of the set of subsequent video frames. Based on such bounding area size data, the video processing system may determine a linear regression to represent how the size of the tracked pattern bounding area changes across the set of subsequent video frames. Thereafter, the video processing system may determine a gradient for the linear regression and compare the gradient to a threshold. When the gradient exceeds the threshold, the video processing system may determine that the tracked pattern bounding area is becoming larger over the subsequent video frames.

To determine whether the tracked pattern bounding area is becoming closer to a bottom of each image in the subsequent video frames, the video processing system may, according to another exemplary embodiment, determine a position of a coordinate along a bottom edge of the tracked pattern bounding area in each video frame of the set of subsequent video frames. The video processing system may then use such bottom coordinate position data to determine a relationship (e.g., distance) between the position of the coordinate along the bottom edge of the tracked pattern bounding area and the reference origin for each video frame of the set of subsequent video frames. Based on such relationship, the video processing system may determine a linear regression to represent how the relationship between the position of the coordinate along the bottom edge of the tracked pattern bounding area and the reference origin changes across the set of subsequent video frames. For example, the video processing system may determine a distance (e.g., actual distance or pixel distance) between the position of the coordinate along the bottom edge of the tracked pattern bounding area and the reference origin for each video frame of the set of subsequent video frames and then determine a linear regression to represent how the distance changes over time across the set of subsequent video frames. The video processing device may further determine a gradient for the linear regression and compare the gradient, which may be negative, to a threshold. When the gradient is greater than the threshold, the video processing system may determine that the tracked pattern bounding area is becoming closer to a bottom of each image in the set of subsequent video frames.

According to a further embodiment in which a tracked pattern bounding area is defined for each tracked pattern, the video processing system may use motion data associated with the person under surveillance to assist with determining whether the tracked pattern or patterns are positioned suspiciously relative to a position of the person under surveillance. According to this embodiment, motion data associated with the person under surveillance may be received by the video processing system in addition to the video data. The motion data is preferably time-synchronized with the video data. The motion data may be received from a camera secured to the body of the person, such as from one or more motion sensors embedded within the camera, or from a mobile device carried by the person under surveillance (e.g., from a smartphone running a mobile application that is time-synchronized with the person's body camera). Where the motion data is supplied by the person's body camera, the motion data may be received by the video processing system as metadata within the video data stream from the camera.

Where motion data for the person is received in addition to video data, the video processing system may use the motion data to assist with determining whether one or more tracked patterns are positioned suspiciously relative to the person under surveillance. In such a case, when the video processing system determines that the person under surveillance is in motion, the video processing system may further determine, based on video data over multiple subsequent video frames, whether one or more tracked patterns are becoming substantially smaller in size (e.g., at least twenty-five percent smaller over one or more video frames) or are no longer present in the video capture area. When the person under surveillance is in motion and the one or more tracked patterns are not becoming substantially smaller in size, the video processing system may determine that the one or more tracked patterns are positioned suspiciously relative to the position of the person. Alternatively, when the person under surveillance is in motion and the one or more tracked patterns are becoming substantially smaller in size, the video processing system may determine that the one or more tracked patterns are not positioned suspiciously relative to the position of the person.

After one or more tracked patterns have been determined to be positioned suspiciously relative to the position of the person under surveillance, the video processing system may alert the person of a potential threat. For example, the video processing system may communicate a message to an application executing on a wireless communication device carried by the person (e.g., smartphone or tablet computer), where the message causes the application to activate an audible alarm and/or a haptic alarm of the wireless communication device. Alternatively, the video processing system may communicate at least some of the video data to a video processing and display application executing on a wireless communication device possessed by the person. Such video data may include static images, a video stream, or both to enable the person under surveillance to independently analyze any potential threat. Alternatively, when a tracked pattern bounding area is defined for a tracked pattern, the video data communicated to the monitored person's wireless device may be augmented with data representing at least one overlay for the tracked pattern bounding area. For example, when a rectangular bounding area is defined for the tracked pattern, the video data communicated to the monitored person's wireless device may be augmented with data representing a rectangular overlay positioned over the tracked pattern so as to visibly indicate the tracked pattern bounding area.

According to an alternative exemplary embodiment, a video processing system receives video data in real time or near real time from at least two cameras. A first camera captures images of a first video capture area that is proximate the person under surveillance but that excludes the person. A second camera captures images of a second video capture area that is proximate the person and includes the person. The video data originating from the first camera includes data representing a first plurality of time-sequenced video frames. The video data originating from the second camera includes data representing a second plurality of time-sequenced video frames. As an example, the first camera may be a Wi-Fi or other wirelessly-enabled video camera secured to the body of the person under surveillance and the second camera may be an Internet-accessible video camera secured to a vehicle or a structure located near the location of the person.

The video processing system determines whether data representing a video frame captured by the first camera includes data representative of one or more predefined patterns, such as a stored set of potential threat patterns. The video processing system also determines whether data representing a video frame captured by the second camera includes data representative of the one or more predefined patterns, as well as data representative of a pattern for the person under surveillance. When the video frame data from the two cameras includes such pattern data, the video processing system commences tracking of the one or more predefined patterns within the video data received from the first and second cameras. Pattern tracking may be commenced immediately upon detecting that video frame data from the two cameras includes data representative of the one or more predefined patterns or such tracking may be commenced selectively, such as only when certain other conditions are met.

After pattern tracking has been commenced, the video processing system determines whether data representing one or more subsequent video frames includes data representative of the tracked pattern or patterns. In other words, after pattern tracking has commenced, the video processing system analyzes some or all of the data representing video frames received from the two cameras, which are subsequent in time to the video frames that triggered the tracking, to determine whether such data includes the tracked pattern or patterns. Such analysis may include comparing some or all of the video data representative of subsequent video frames to previously stored data representative of one or more predefined patterns or comparing some or all of the video data representative of subsequent video frames to data representative of a pattern detected in a prior video frame. The quantity of video frames analyzed by the video processing system may be selected based on several factors, including camera video quality, location and/or size of the video capture areas, positioning of the person within a video capture area, quantity and type of physical and natural structures in or near the video capture areas, and so forth.

When data representing one or more subsequent video frames as received from the first and second cameras includes data representative of the tracked pattern or patterns, the video processing system determines, based on the analyzed data and the data representative of the tracked pattern or patterns, whether the tracked pattern or patterns are positioned suspiciously relative to a position of the person under surveillance. To make such a determination according to one exemplary embodiment, the video processing system determines, based on the analyzed data and the data representative of the tracked pattern or patterns, (a) a distance between the one or more tracked patterns and the person and (b) one or more motion vectors for the tracked pattern or patterns relative to the position of the person. When the distance between the one or more tracked patterns and the person under surveillance is determined to be less than a threshold (e.g., less than about 45 feet or 14 meters) and the one or more motion vectors are in a general direction of the position of the person, the video processing system may determine that the one or more tracked patterns are positioned suspiciously relative to the position of the person. For example, the video processing system may compare data representative of a tracked pattern in one subsequent video frame to data representative of the same tracked pattern in another subsequent video frame on a camera-by-camera and video frame-by-video frame basis. Based on such comparison, the video processing system may determine distances between the tracked pattern and the person under surveillance, as well as motion vectors for the tracked pattern, which represent movement of the tracked pattern over time. When the determined distance between the tracked pattern and the person under surveillance (which may be a distance as determined from video data from one of the cameras or an average distance as determined from video data from both cameras) is less than a threshold and the motion vectors are determined to be in the general direction of the person, the video processing system may determine that the one or more tracked patterns are positioned suspiciously (e.g., in a potentially threatening manner) relative to the position of the person.

After one or more tracked patterns have been determined to be positioned suspiciously relative to the position of the person under surveillance, the video processing system may alert the person of a potential threat. For example, the video processing system may communicate a message to an application executing on a wireless communication device carried by the person (e.g., smartphone or tablet computer), where the message causes the application to activate an audible alarm and/or a haptic alarm of the wireless communication device. Alternatively or additionally, the video processing system may communicate at least some of the video data to a video processing and display application executing on a wireless communication device possessed by the person so the person may conduct his or her own analysis of the video under the circumstances.

According to yet another embodiment, a system may be configured to detect a threat to a person. In this embodiment, the system includes at least one camera and a video processing apparatus. The one or more cameras are positioned to capture images of a video capture area proximate the person under surveillance. For example, the camera or cameras may be secured to the person's body, to a vehicle near the person (e.g., a vehicle that may have transported the person to his or her current location), to a building near the person, and/or to or within some other object near the person.

The video processing apparatus is communicatively coupled to the one or more cameras and includes a communication interface and a video processor operably coupled thereto. The communication interface is operable to receive video data in real time or near real time from the one or more cameras, where the video data includes data representing a plurality of time-sequenced video frames. The communication interface may support one or more communication protocols, including wide area wireless protocols (e.g., 3G, 4G, Long Term Evolution (LTE), WiMAX, and any future-developed wide area wireless protocols, such as 5G), short-range wireless protocols (e.g., Wi-Fi, Bluetooth, Zigbee), digital wireline protocols (e.g., Ethernet, SDI, TVI, CVI), and Internet-compatible network and transport protocols (e.g., TCP/IP, UDP/IP). The video processor operates in accordance with a set of operating instructions (e.g., as contained in operating software, firmware, or other code) to perform several functions.

In particular, the video processor is operable to determine, from the received video data, whether data representing a video frame includes data representative of one or more predefined patterns. For example, according to an exemplary embodiment, the video processor may compare the video frame data to previously stored data representative of one or more predefined patterns, such as a set of potential threat patterns. When at least a portion of the video frame data is determined to include data representative of one or more predefined patterns, the video processor may commence tracking of the one or more predefined patterns with the video data. According to one exemplary embodiment, the video processor analyzes video frame data on a periodic basis after pattern tracking has commenced.

After pattern tracking has been commenced, the video processor determines, from the video data, whether data representing one or more subsequent video frames includes data representative of the one or more tracked patterns. When at least a portion of the data representing the one or more subsequent video frames is determined to include data representative of the one or more tracked patterns, the video processor determines whether the one or more tracked patterns are positioned suspiciously relative to a position of the person under surveillance. When a tracked pattern is determined to be so positioned, the video processor alerts the person under surveillance. According to one exemplary embodiment, such alerting may be accomplished by communicating a message through the communication interface to an application (e.g., mobile application) executing on a wireless communication device carried by the person, where the message causes the application to activate at least one of an audible alarm and a haptic alarm of the wireless communication device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the one or more embodiments of the present invention as set forth in the appended claims.

Skilled artisans will appreciate that elements in the figures are illustrated for simplicity and clarity and have not necessarily been drawn to scale or to include every component of an element. For example, the dimensions of some of the elements in the figures may be exaggerated alone or relative to other elements, or some and possibly many components of an element may be excluded from the element, to help improve the understanding of the various embodiments of the present disclosure. Skilled artisans will also appreciate that the drawings are not intended to be comprehensive; thus, they may exclude elements and functions that would be readily apparent to those skilled in the art in order to implement the methods and systems described herein.

DETAILED DESCRIPTION

Detailed embodiments of video analysis-based threat detection methods and systems are disclosed herein; however, such embodiments are merely exemplary in nature. Therefore, specific structural and functional details disclosed herein are not to be interpreted as limiting, but rather should be interpreted merely as a basis for the claims and as a representative basis for teaching one skilled in the art how to carry out the disclosed methods and systems in appropriate circumstances. Except as expressly noted, the terms and phrases used herein are not intended to be limiting, but rather are intended to provide an understandable description of the disclosed methods and systems.

Figure 1:
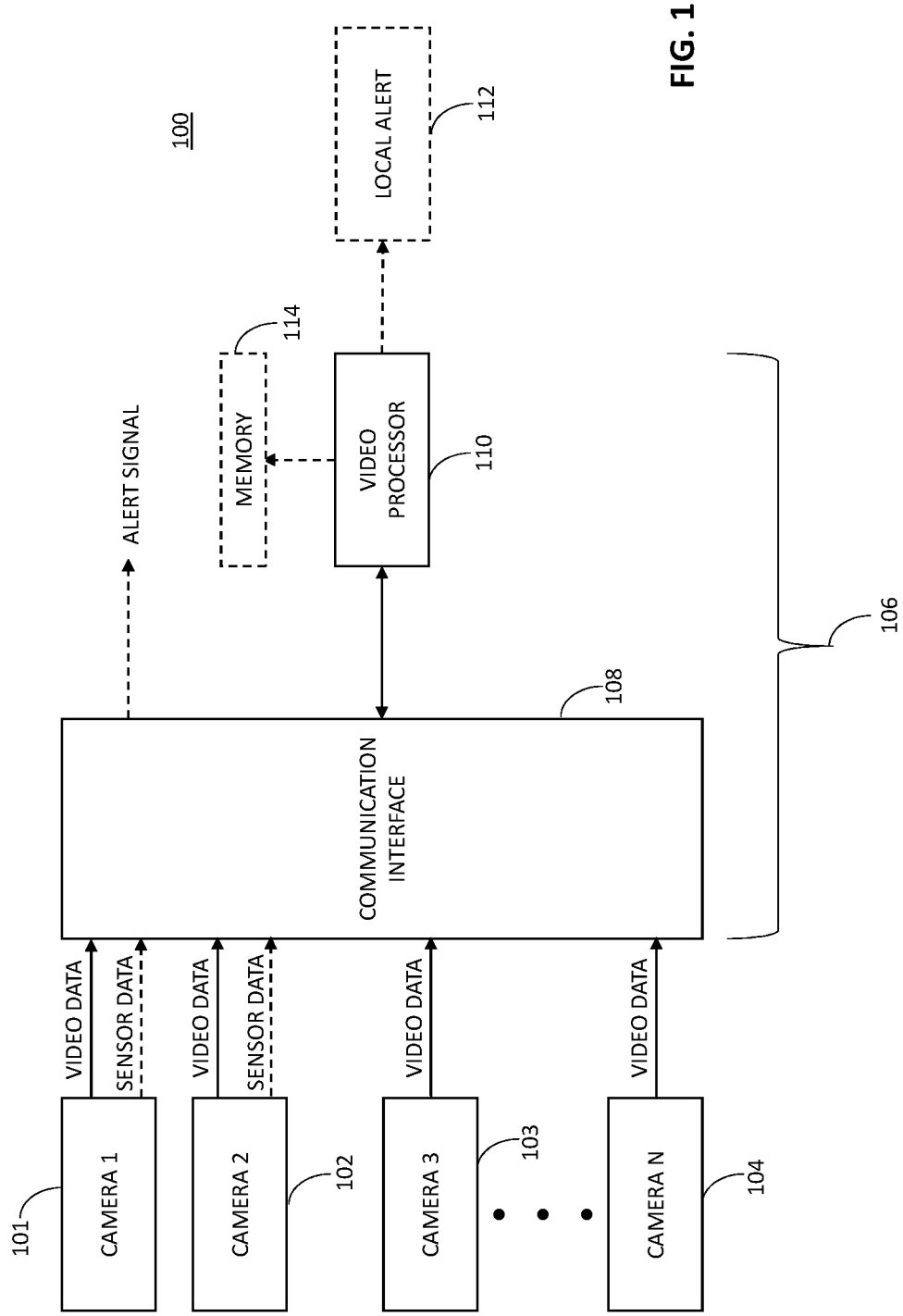
FIG. 1 is an electrical block diagram of a video processing system in accordance with an exemplary embodiment of the present disclosure.

Exemplary embodiments of the present disclosure can be more readily understood with reference to FIGS. 1-8, in which like reference numerals designate like items. FIG. 1 is an electrical block diagram of a video processing system 100 in accordance with an exemplary embodiment of the present disclosure. According to this embodiment, the video processing system 100 includes, inter alia, one or more cameras 101-104 (four shown for illustration) and a video processing apparatus 106. The video processing apparatus 106 may include, inter alia, a communication interface 108, a video processor 114, and an optional memory 114.

The cameras 101-104 are preferably commercially-available, digital, high-definition cameras, such as panoramic cameras available from 360fly, Inc. of Fort Lauderdale, Fla., but may also or alternatively be any high definition security cameras with the capability to communicate video data over one or more communication networks. Where one of the cameras (e.g., camera 101) is intended to be secured to a body of a person under surveillance, the camera 101 may be a low profile, wide-angle, panoramic camera, such as the panoramic camera disclosed in U.S. Patent Application Publication No. US 20170195563 A1, which publication is incorporated herein by this reference. Additionally, where one or more of the cameras (e.g., cameras 101, 102) are secured to a person's body, a vehicle, or other movable object, the cameras 101, 102 may include one or more types of motion sensors, such as two-axis or three-axis accelerometers, gyroscopes, magnetometers, GPS units, and/or composite inertial measurement units. The cameras 101-104 may further include communication circuitry sufficient to communicate video data and optional motion data (e.g., sensor data) over wireless and/or wired networks to the video processing apparatus 106.

With regard to the video processing apparatus 106, the communication interface 108 includes antennas, filters, amplifiers, transceivers, modems, transcoders, and any other hardware and/or software necessary to facilitate communication between the cameras 101-104 and the video processor 110 over known or future-developed wired or wireless networks. Such networks may include Wi-Fi (IEEE 802.11 a/b/g/n/ac); WiMAX (IEEE 802.16); 3G (CDMA, GSM), 4G LTE, and 5G cellular networks; and/or Ethernet. The communication interface 108 provides communicative coupling between the video processing apparatus 106 and the cameras 101-104.

The video processor 110 is operably coupled to the communication interface 108 and may be any digital video processor or combination of digital video processors capable of decoding, analyzing, and otherwise processing video data and optional sensor data received from the cameras 101-104. Where the video processing apparatus 106 is operable to communicate video data or augmented video data to a wireless communication device carried by a person under surveillance, such as a smartphone, tablet computer, personal digital assistant-type device, or other handheld mobile device, the video processor 110 may further include capability to encode video data for viewing on such a device. According to one exemplary embodiment, the video processor 110 is implemented as a system on a chip (SoC) programmed to execute a video codec and real-time communication protocols, as well as perform other processing functions on video data and optional sensor data received from the cameras 101-104 in accordance with various embodiments of the present disclosure.

Where the video processor 110 does not include onboard memory or includes an inadequate amount of onboard memory for purposes of carrying out all of its functions in accordance with the present disclosure (e.g., where the video processor 110 includes onboard memory to store firmware, but not application software), the video processing apparatus 106 may include separate memory 114 to meet the operational requirements of the video processing apparatus 106. The memory 114 may store executable code that contains the operating instructions for the video processor 110, as well as store video data, motion data, or other data used during video processing or desired for later retrieval. The memory 114 may include volatile memory (such as random access memory (RAM)) and non-volatile memory (such as various types of read only memory (ROM)).

Where the video processing apparatus 106 is collocated with a local alerting mechanism 112, such mechanism 112 may include an audio speaker, horn, one or more lights or lighting units, and/or a video display. The local alerting mechanism 112 is intended to quickly alert the person under surveillance as to the presence of a possible threat when the video processing apparatus 110, as part of the overall video processing system 100, determines from received video data (and optionally motion data) that such a potential threat is present. Where a local alerting mechanism is not present or desired, the video processor 110 may communicate an alert signal to a remote alerting device, such as a wireless communication device carried by the person under surveillance, by way of the communication interface 108.

Operation of video processing systems, such as video processing system 100, will be described below in connection with FIGS. 2-7. An optional cloud-based implementation of the video processing apparatus 106 is described below in connection with FIG. 8.

Figure 2:
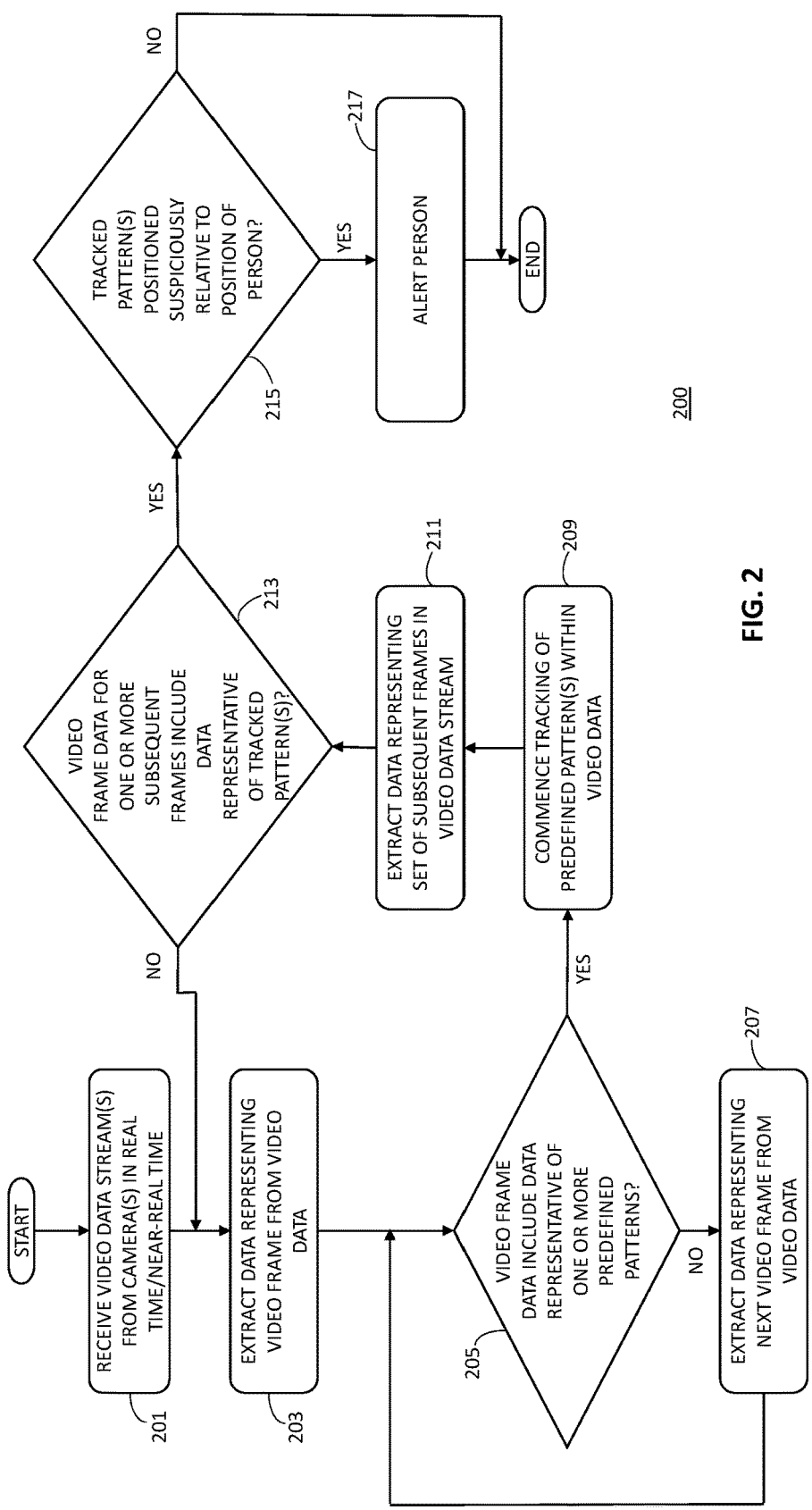
FIG. 2 is a process flow diagram of steps executed by a video processing system to detect a threat to a person based on real-time or near real-time video analysis in accordance with another exemplary embodiment of the present disclosure.

Referring now to FIG. 2, there is shown a process flow diagram 200 of steps executed by a video processing system to detect a threat to a person based on real-time or near real-time video analysis in accordance with an exemplary embodiment of the present disclosure. The steps of the process flow diagram 200 may be performed by the video processing system (and primarily by its video processor) through execution of stored operating instructions (firmware and/or software). By way of example, but not limitation, the threat detection process flow of FIG. 2 is described below with reference to the video processing system 100 of FIG. 1.

The process flow begins when one or more cameras 101-104 capture images within video capture areas defined by the cameras' respective fields of view. The cameras 101-104 generate encoded video data streams from the images and divide the video streams into a series of time-sequenced or time-stamped video frames according to the video streaming protocol being used. In one exemplary embodiment, the camera or cameras 101-104 are configured to capture images and encode video data at a rate of at least 30 frames per second. The video streams are communicated to the video processing apparatus 106 for video analysis processing.

The cameras' fields of view are such that the cameras' video capture areas are proximate the location of the person under surveillance when the threat detection process is being executed. For example, one camera 101 may be a low profile or other style body camera secured to the back of the person under surveillance, such as through use of a strap or belt, vest, holster, or other device. Such a camera 101 may, depending on its capabilities, capture images extending out several feet or meters (e.g., 150 feet or 50 meters or more) as referenced from the person's position.

Another one or more cameras 102-104 may be mounted at predetermined locations on a vehicle (e.g., truck, car, boat, bus, motorcycle, and so forth) that transported the person to his or her current location or that is otherwise positioned near the person under surveillance. The positioning of the cameras 102-104 on the vehicle may be such that the cameras 102-104 captures images of the person and his surroundings at locations where the person is expected to be after stopping the vehicle. For example, where the person is a courier for a package delivery service company or a security guard for a cash management or transport service company, the vehicle-mounted cameras 102-104 may be mounted to the vehicle at multiple locations, such as the driver's side of the vehicle (e.g., adjacent the driver's side door or on the driver's side of the hood), the passenger's side of the vehicle, and/or the back of the vehicle (e.g., above and/or adjacent to the rear doors). Depending on the types of cameras 102-104 utilized, the cameras 102-104 may capture images extending out several feet or meters (e.g., 150 feet or 50 meters or more) from the vehicle.

Other cameras may be mounted at fixed locations near the location of the person. For example, cameras may be mounted to buildings, canopies, trees, or other objects, or within structures (e.g., within an ATM) at the general location of the person. Due to their positioning, such cameras may capture images within a much wider video capture area than the video capture areas of body-mounted or vehicle-mounted cameras.

The video processing apparatus 106 receives (201) a video data stream from each camera 101-104 in real time or near real time via the apparatus' communication interface 108. In other words, each camera 101-104 captures images, encodes the images into video data containing time-sequenced video frames, and communicates the video data to the video processing apparatus 106 as a stream of video frames in accordance with a video streaming protocol, without intentionally delaying the flow of video data any more than is necessary. That is, neither the video processing apparatus 106 nor the video processing system 100 as a whole introduces any delays other than normal processing and communication delays. Use of the terms "real time," "real-time," "near real-time," and "near real time" take into account such inherent delays. The video processor 110 may use one or more video streaming control protocols, such as version 2.0 of the Real Time Streaming Protocol (RTSP 2.0) or any successor thereof as standardized by the Internet Engineering Task Force (IETF) or another standards body, to control the delivery of video data from the cameras 101-104. According to one exemplary embodiment, the cameras 101-104 and the video processor 110 use video transport and streaming protocols, such as the Real-Time Messaging Protocol (RTMP) and the Real-Time Transport Protocol (RTP) or any successors thereof as standardized by the IETF or another standards body, to transmit and receive video data in real time or near real time.

As the video data from a particular camera 101-104 is received at the video processor 110, the video processor 110 extracts (203) data representing a video frame from the video data based on the video streaming protocol and the video codec (e.g., H.264 or H.265) used by the camera 101-104 and the video processor 110, and determines (205) whether the video frame data includes data representative of one or more predefined patterns. For example, the video processor 110 may compare portions of the video frame data to data representative of a set of predefined, potential threat patterns previously stored in memory 114 to determine whether the video frame or any portion thereof includes data substantially similar to data representative of a potential threat pattern. Video data may be considered substantially similar to pattern data where the video data has at least a fifty percent (50%) correspondence with the pattern data. Additionally or alternatively, the video processor 110 may execute machine learning and computer vision algorithms to perform object detection, face detection, face recognition, summarization, thread detection, natural language processing, sentiment analysis, traffic monitoring, intention detection and so on to evaluate whether the video frame data includes data representative of one or more predefined patterns.

The set of predefined patterns may include, for example, the outline or other features of a human body or a portion thereof, the outline or other features of one or more predetermined objects (such as a firearm, knife, bat, club, TASER, or other object that could be used as a weapon) and the outline or other features of a vehicle. The video processor 110 may be programmed to update and/or expand the stored threat pattern data by applying machine learning techniques, such as supervised learning techniques (e.g., pattern recognition, object classification, and/or regression algorithms), unsupervised learning techniques (e.g., association, clustering, and/or dimensionality reduction algorithms), and/or reinforcement learning techniques, to video data received by the video processor 110 over time.

Where the video processing apparatus 106 receives video data streams from multiple cameras 101-104, the video processor 110 analyzes each video stream separately and may use metadata within the video streams to time-synchronize the streams. The metadata for each video data stream may include a time-and-date stamp, which permits the video processor 110 to align the video frames of the video data streams even though such streams may be received at different times by the video processing apparatus 106.

When the video frame data from a particular camera 101-104 does not include data representative of a predefined pattern, the video processor 110 extracts (207) data representing the next video frame from the video data stream and determines (205) whether that video frame data includes data representative of one or more of the predefined patterns. When the video frame data from a particular camera includes data representative of at least one predefined pattern (e.g., a pattern match or correspondence occurs), the video processor 110 commences (209) tracking of the detected pattern or patterns within the video data and extracts (211) data representing one or more subsequent video frames from the video data stream.

According to one exemplary embodiment, pattern tracking continues for a predetermined period of time over a predetermined set of subsequent video frames, which period may be extended by the video processor 110 based on pre-established extension criteria. The set of subsequent video frames may include contiguous video frames, periodically positioned video frames (e.g., every other video frame in the set, every third video frame in the set, and so forth), or randomly selected video frames within the tracking time period. For example, where the video data was captured by the camera 101-104 at 30 frames per second, pattern tracking may continue for a fraction of a second (e.g., 333 milliseconds or 500 milliseconds) or for multiple seconds as may be selected by the system operator. As a further example, where pattern tracking is to be performed on contiguous video frames for a period of 500 milliseconds after a pattern has been detected and the video data includes 30 frames per second, pattern tracking may be programmed to occur for data representing fifteen consecutive video frames.

The video processor 110 analyzes the data representing the set of one or more subsequent video frames and determines (213) whether that video frame data includes data representative of the tracked pattern or patterns (e.g., determines whether any portion of the video frame data in the tracked video frames is substantially similar to the tracked pattern or patterns). If a tracked pattern is found in the data representing the set of subsequent video frames, the video processor 110 determines (215) whether the tracked pattern is positioned suspiciously relative to the position of the person under surveillance. Otherwise, the video processor 110 extracts (203) the next video frame from the video data and the process repeats.

To determine whether the tracked pattern is positioned suspiciously, the video processor 110 may determine a motion vector (e.g., velocity) for the tracked pattern based on the video frame data and, responsive thereto, determine whether the motion vector is on a track to intercept or pass closely to the person under surveillance. For example, by analyzing video data from a camera (e.g., camera 102) positioned other than on the person under surveillance's body, the video processor 110 may initially (e.g., at block 205) detect a potential threat pattern, as well as the pattern of the person under surveillance. The video processor 110 may thereafter commence pattern tracking and compute a velocity of the tracked pattern and a velocity of the person under surveillance over the tracking period. If the tracked pattern and person are projected to intercept at a threshold time in the future (e.g., within five seconds), the video processor 10 may determine that the tracked pattern is positioned suspiciously relative to the person under surveillance. Alternatively, by analyzing video data from a camera (e.g., camera 101) positioned on the person's body, the video processor 110 may determine that the tracked pattern is approaching the person under surveillance, which may be deemed a suspicious positioning of the tracked pattern depending on other factors, such the position and rate of approach, and/or the presence of another predefined pattern in the video data (e.g., the pattern for a weapon). One exemplary process for determining whether a tracked pattern is positioned suspiciously relative to the position of a person under surveillance is described below with respect to FIG. 3. Another exemplary process for determining whether a tracked pattern is positioned suspiciously relative to the position of a person under surveillance based on analysis of video data from the person's body camera and from a nearby fixed-position or static camera is described below with respect to FIG. 4.

When the video processor 110 determines that one or more tracked patterns are positioned suspiciously relative to the position of the person under surveillance, the video processor 110 alerts (217) the person under surveillance as to a potential threat. For example, the video processor 110 may activate a local alert, such as activate an audible and/or visual alarm or send an audio message to a local sound speaker, to notify the person. Alternatively, the video processor 110 may communicate, via the communication interface 108, an alert message to a mobile application executing on a wireless communication device carried by the person (e.g., smartphone, cellular phone, tablet computer, personal digital assistant). In the latter case, the alert message may cause the mobile application to activate an audible alarm and/or a haptic alarm of the wireless communication device to notify the person of the potential threat. Still further, the video processor 110 may communicate, via the communication interface 108, at least some of the video data from the analyzed video stream (e.g. the last ten seconds or 300 video frames) to a mobile video processing and display application executing on a wireless communication device carried by the person. In this case, the mobile application may be configured to automatically play and display the received video to enable the person under surveillance to assess the potential threat and react thereto as necessary.

Figure 3:
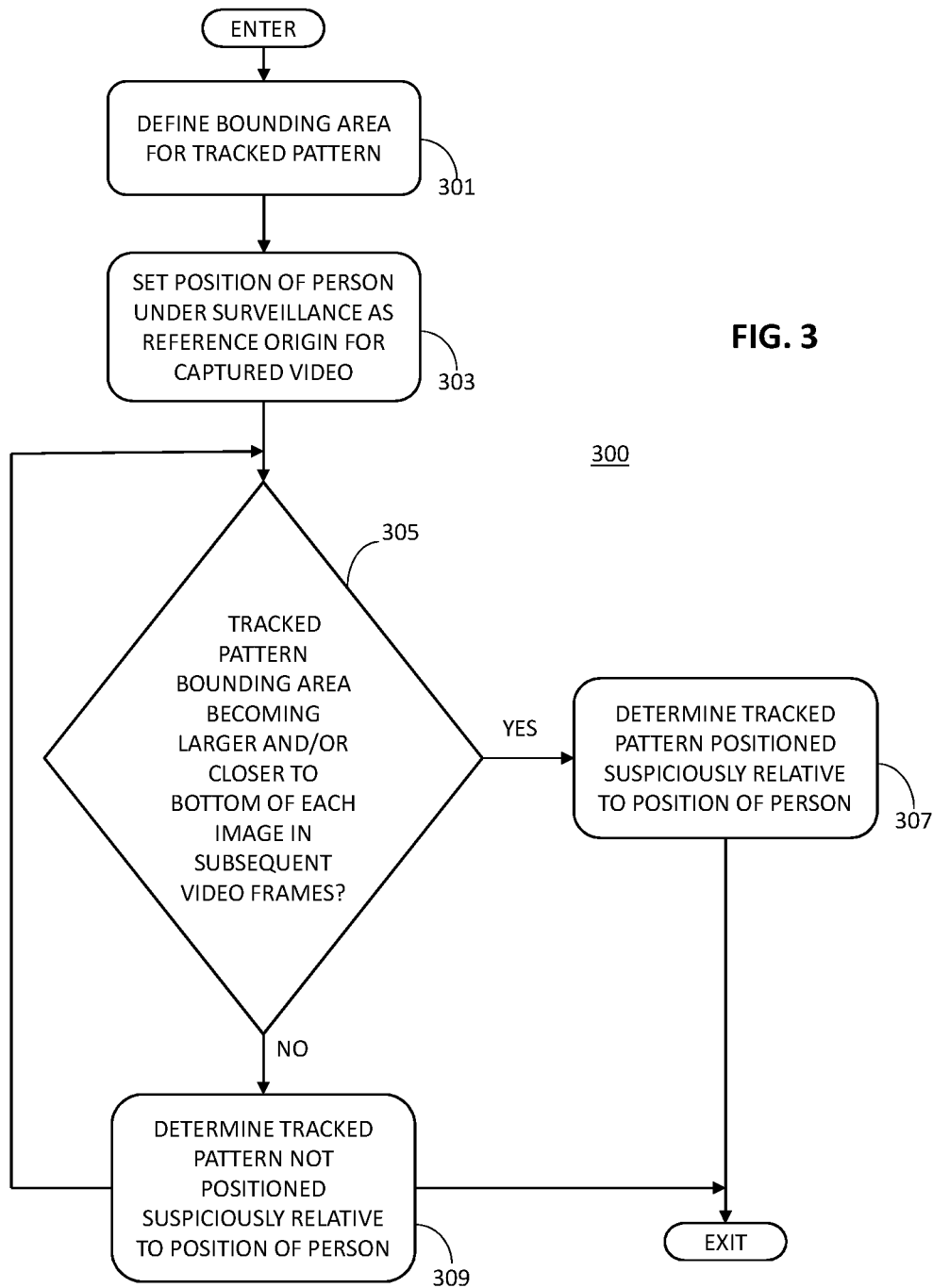
FIG. 3 is a process flow diagram of steps executed by a video processing system to determine whether a tracked pattern is positioned suspiciously relative to a position of a person under video surveillance, in accordance with another exemplary embodiment of the present disclosure.

FIG. 3 is a process flow diagram 300 of steps executed by a video processing system 100 (e.g., through operation of its video processor 110) to determine whether a tracked pattern is positioned suspiciously relative to a position of a person under video surveillance, in accordance with one exemplary embodiment of the present disclosure. The process flow illustrated in FIG. 3 may have particular applicability for analyzing video data supplied by a camera secured to the body of the person under surveillance.

According to the logic flow of FIG. 3, the video processor 110 defines (301) a bounding area for the tracked pattern. The bounding area may be defined by a square, rectangle, oval, triangle, or other geometric shape positioned around the tracked pattern to form a trackable area for purposes of reducing the amount of processing resources necessary to track the pattern and its positioning relative to a position of the person under surveillance. In other words, each tracked pattern may be "bounded" within a predefined or adaptive virtual area to make pattern tracking less processing intensive.

In addition to defining a bounding area for each tracked pattern, the video processor 110 sets (303) the position of the person under surveillance as the reference origin for the video data stream being processed. Thus, the position of the person under surveillance is the reference point for all calculations and other determinations relevant to evaluating the positioning of the tracked pattern according to this exemplary embodiment.

Once the tracked pattern bounding area has been defined and the reference origin set, the video processor 110 determines (305) whether the tracked pattern bounding area is becoming larger and/or closer to the bottom of each image in the set of subsequent video frames that is subject to pattern tracking analysis. To determine whether the tracked pattern bounding area is becoming larger in the set of subsequent video frames, the video processor 110 may, according to an exemplary embodiment, determine a size of the tracked pattern bounding area in each video frame of the set of subsequent video frames. Based on such bounding area size data, the video processor 110 may determine a linear regression to model how the size of the tracked pattern bounding area (e.g., size of the pixel area) changes across the set of subsequent video frames. Thereafter, the video processor 110 may determine a gradient for the linear regression and compare the gradient to a threshold. When the gradient exceeds the threshold, the video processor 110 may determine that the tracked pattern bounding area is becoming larger over the subsequent video frames. Therefore, according to this exemplary embodiment, the video processor 110 may be programmed to use a simple or Bayesian linear technique to interpret the bounding area data captured over the set of subsequent video frames for the purpose of evaluating whether the tracked pattern bounding area is becoming larger over time. Those of ordinary skill in the art will readily recognize and appreciate that the video processor 110 may be programmed to use other known regression or statistical analysis techniques to evaluate how the size of the tracked pattern bounding area is changing over the set of subsequent video frames.

To determine whether the tracked pattern bounding area is becoming closer to a bottom of each image in the set of subsequent video frames, the video processor 110 may, according to an exemplary embodiment, determine a position of a coordinate along a bottom edge of the tracked pattern bounding area in each video frame of the set of subsequent video frames. The determined position may be a pixel position or an estimated physical position of the edge of the boundary area under an assumption that the boundary area actually existed in the real world. For example, the video processor 110 may determine a position of the center coordinate along the bottom edge of the tracked pattern bounding area, although the position of any coordinate along the bottom edge of the tracked pattern bounding area may suffice with appropriate angular correction applied, if necessary.

The video processor 110 may then use the bottom coordinate position data to determine a relationship (e.g., an estimated distance) between the position of the coordinate along the bottom edge of the tracked pattern bounding area and the reference origin for each video frame of the set of subsequent video frames. Based on such relationship, the video processing system may determine a linear regression to represent how the relationship between the position of the coordinate along the bottom edge of the tracked pattern bounding area and the reference origin changes across the set of subsequent video frames. For example, the video processor 110 may determine a distance (e.g., an estimated actual distance or pixel distance) between the position of the coordinate along the bottom edge of the tracked pattern bounding area and the reference origin for each video frame of the set of subsequent video frames and then determine a linear regression to model how the distance changes over time across the set of subsequent video frames.

The video processor 110 may further determine a gradient for the linear regression and compare the gradient, which may be negative, to a threshold. When the gradient is greater than the threshold, the video processor 110 may determine that the tracked pattern bounding area is becoming closer to a bottom of each image in the set of subsequent video frames. Those of ordinary skill in the art will readily recognize and appreciate that the video processor 110 may be programmed to use other known regression or statistical analysis techniques to evaluate how the position of the tracked pattern bounding area is changing over the set of subsequent video frames. Additionally, those of ordinary skill in the art will readily recognize and appreciate that the video processor 110 may be programmed to use other position coordinates along another edge or edges of the tracked pattern bounding area in order assess whether the tracked pattern bounding area is becoming closer to a bottom of each image in the set of subsequent video frames. More detailed exemplary embodiments for using tracked pattern bounding area changes (or lack thereof) over multiple video frames to assist in the determination of whether a tracked pattern is positioned suspiciously relative to a person under surveillance are described below with respect to FIGS. 5-7.

When the video processor 110 determines that the tracked pattern bounding area is becoming larger and/or closer to the bottom of each image in the set of subsequent video frames that is subject to pattern tracking analysis, the video processor determines (307) that the tracked pattern is positioned suspiciously relative to the person under surveillance. On the other hand, when the video processor 110 determines that the tracked pattern bounding area is not becoming larger and/or closer to the bottom of each image in the set of subsequent video frames that is subject to pattern tracking analysis, the video processor determines (309) that the tracked pattern is not positioned suspiciously relative to the person under surveillance. Thus, according to this embodiment, the video processor 110 may determine that the tracked pattern is positioned suspiciously relative to the person under surveillance if the tracked pattern bounding area is becoming larger over the set of subsequent video frames, the tracked pattern is becoming closer to the bottom of each image over the set of subsequent video frames, or both. For example, if the tracked pattern is a pattern of a person, the bounding area is the area of a rectangle positioned around the tracked pattern, and the person is running toward the person under surveillance, the size of the tracked pattern bounding area will increase and a coordinate along the bottom edge of the tracked pattern bounding area will become closer to a bottom of each image over the set of subsequent video frames indicating suspicious positioning of the tracked pattern. On the other hand, if the tracked pattern is the pattern of a drone, the bounding area is the area of a rectangle positioned around the tracked pattern, and the drone is flying toward the person under surveillance while also increasing in altitude, the size of the tracked pattern bounding area may not increase over the set of subsequent video frames, but a coordinate along the bottom edge of the tracked pattern bounding area will become closer to a bottom of each image over the set of subsequent video frames. In this case, movement of the drone toward the person under surveillance results in the tracked pattern bounding area becoming closer to a bottom of each image in the subsequent video frames, thereby indicating suspicious positioning of the tracked pattern relative to the person under surveillance.

Figure 4:
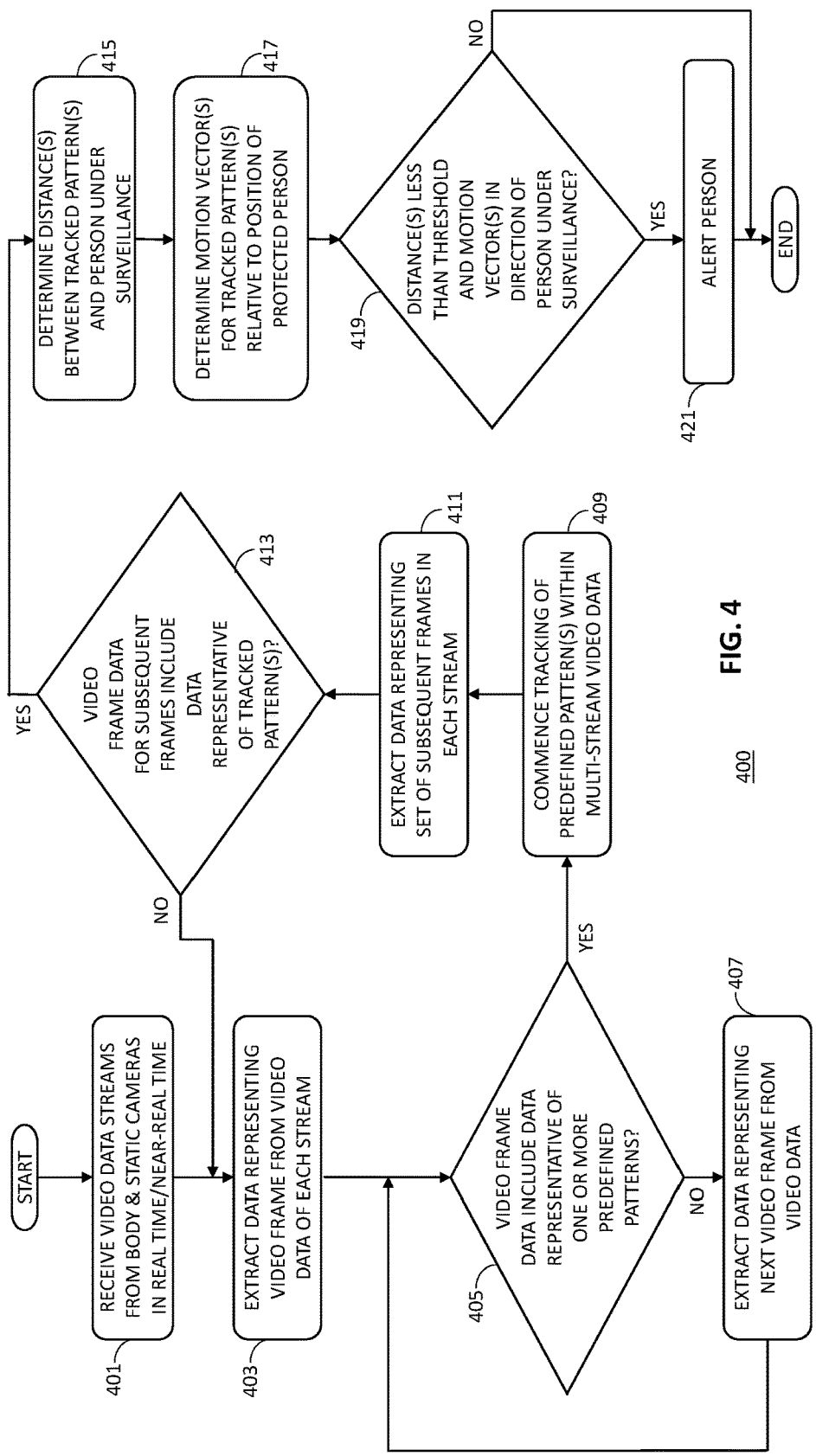
FIG. 4 is a process flow diagram of steps executed by a video processing system to detect a threat to a person based on real-time or near real-time analysis of video data supplied by multiple cameras in accordance with a further exemplary embodiment of the present disclosure.

FIG. 4 is a process flow diagram 400 of steps executed by a video processing system 100 to detect a threat to a person based on real-time or near real-time analysis of video data supplied by multiple cameras in accordance with a further exemplary embodiment of the present disclosure. According to this embodiment, the video processing system 100, through operation of its communication interface 108 and video processor 110, receives (401) video data streams from a camera secured to the body of the person under surveillance and one or more statically-positioned cameras. The statically-positioned cameras may be mounted to or within one or more objects, such as a vehicle, a light pole, an awning or canopy, a structural support pole, a telephone pole, a tree, an automated teller machine (ATM), or any other object. The video processor 110 may also be programmed to use a streaming control protocol, such as RTSP, to control the video data streams from the multiple cameras.

As each video data stream is received at the video processor 110, the video processor 110 extracts (403) data representing a video frame from the video data based on the video streaming protocol and the video codec used by the camera 101-104 and the video processor 110, and determines (405) whether the video frame data includes data representative of one or more predefined patterns. As discussed above with respect to FIG. 1, the video processor 110 may compare portions of the video frame data to data representative of a set of predefined, potential threat patterns previously stored in memory 114 to determine whether the video frame or any portion thereof includes data substantially similar to data representative of a potential threat pattern.

When the video frame data from a particular camera 101-104 does not include data representative of a predefined pattern, the video processor 110 extracts (407) data representing the next video frame from the video data stream and determines (205) whether that video frame data includes data representative of one or more of the predefined patterns. When the video frame data from a particular camera includes data representative of at least one predefined pattern, the video processor 110 commences (409) tracking of the detected pattern or patterns within the video data and extracts (411) data representing one or more subsequent video frames from the video data stream.

According to one exemplary embodiment, tracking continues for a predetermined period of time over a predetermined set of subsequent video frames, which period may be extended by the video processor 110 based on pre-established extension criteria. The set of subsequent video frames may include contiguous video frames, periodically positioned video frames (e.g., every other video frame in the set, every third video frame in the set, and so forth), or randomly selected video frames within the tracking time period. The video processor 110 analyzes the data representing the set of one or more subsequent video frames and determines (413) whether that video frame data includes data representative of the tracked pattern or patterns (e.g., determines whether any portion of the video frame data in the tracked video frames is substantially similar to the tracked pattern or patterns). If a tracked pattern is found in the data representing the set of subsequent video frames, the video processor 110 proceeds to determine whether the one or more tracked patterns are positioned suspiciously relative to a position of the person under surveillance. To make a suspicious positioning determination according to this particular exemplary embodiment, the video processor 110 determines (415) a distance between the tracked pattern and the person under surveillance. If a tracked pattern is not found in the data representing the set of subsequent video frames, the video processor 110 extracts (403) the next video frame from the video data and the process repeats.

To determine the distance between a tracked pattern and the person under surveillance, the video processor 110 may be programmed to measure pixel distances between points on the tracked pattern and points on the person for video captured from one or more statically-positioned cameras (e.g., cameras 103, 104). In other words, the video processor 110 may analyze the video frames in the video data streams received from one or more statically-positioned cameras capturing images of video capture areas that include the subject of the tracked pattern and the person under surveillance. The video processor 110 may also use the body camera of the person under surveillance (e.g., camera 101) to aid in the determination of distance, such as by using video data from the body camera to determine an angle at which the subject of the tracked pattern is located relative to a reference axis. The video processor 110 may further determine the distance between the tracked pattern and the person under surveillance as a function of camera lens profile specifications for the camera from which the video data under analysis was received, a position of the tracked pattern within the video frame, and a size of the tracked pattern bounding area. For example, the video processor 110 may receive video data streams from two statically-positioned cameras to improve the accuracy of the potential threat assessment made by just using video data from the body camera of the person under surveillance. In another example, two or more statically-positioned cameras and the body camera of the person under surveillance may be used to generate a three-dimensional (3D) model of the person's environment and determine a distance vector between the tracked pattern and the person under surveillance.

Alternatively, the video processor 110 may be programmed to determine a distance between a tracked pattern and the person under surveillance by determining coordinates of the tracked pattern within a 3D environment model $(X_i, Y_i, Z_i)$ generated from video data supplied by two or more statically-positioned cameras and the body camera of the person under surveillance, and computing the distance as follows:

$$\text{Distance} = \text{SQRT}[(X_{i+n}-X_i)^2 + (Y_{i+n}-Y_i)^2 + (Z_{i+n}-Z_i)^2],$$

where "i" is the frame index and "n" is the number of frames used to compute the distance.

In addition to determining a distance between each tracked pattern and the person under surveillance, the video processor 110 determines (417) a motion vector for each tracked pattern relative to the person under surveillance. To determine such a vector, the video processor 110 may be programmed to compute a velocity vector as follows:

$$\text{Velocity Vector} = [(X_{i+n}-X_i),(Y_{i+n}-Y_i),(Z_{i+n}-Z_i)]/(T_{i+n}-T_i)$$

where "i" is the frame index, "n" is the number of frames used to compute the velocity vector, and "$T_i$" is the time corresponding to index i.

After the distance between the tracked pattern and the person under surveillance and the tracked pattern's motion vector have been determined, the video processor 110 determines (419) whether the determined distance is less than a threshold and whether the motion vector is in a general direction of the person under surveillance. When both conditions have been met according to this embodiment, the video processor alerts (421) the person under surveillance as to a potential threat. By contrast, when both conditions have not been met, the logic flow ends with respect to the currently processed set of video frames and may be restarted with respect to the next set of video frames.

For example, where the video processing system 100 is utilized to monitor potential threats to employees of a cash transport service, the threshold distance may be set to about thirty feet (about ten meters) and the motion vector may be deemed to be in the general direction of the employee when the motion vector is within a 40° range (+/−20°) about a longitudinal or optical axis of the employee's body camera. Thus, according to this example, the video processor 110 may determine that a tracked pattern is a potential threat if, in an analyzed video frame, the pattern is positioned less than thirty feet from the employee and is moving within a range of +/−20° from the longitudinal axis of the employee's body camera. When the distance and motion conditions have been met, the video processor 110 may alert the person under surveillance as to a potential threat. Such alerting may be achieved by, for example: activating a local alert (such as an audible and/or visual alarm); communicating, via the communication interface 108, an alert message to a mobile application executing on a wireless communication device carried by the person; and/or communicating, via the communication interface 108, at least some of the video data from the analyzed video stream (e.g., the last ten seconds or 300 video frames) to a mobile video processing and display application executing on a wireless communication device carried by the person. In the latter case, the application may be configured to automatically play and display the received video to enable the person under surveillance to promptly assess the potential threat and react thereto as necessary.

Figure 5:
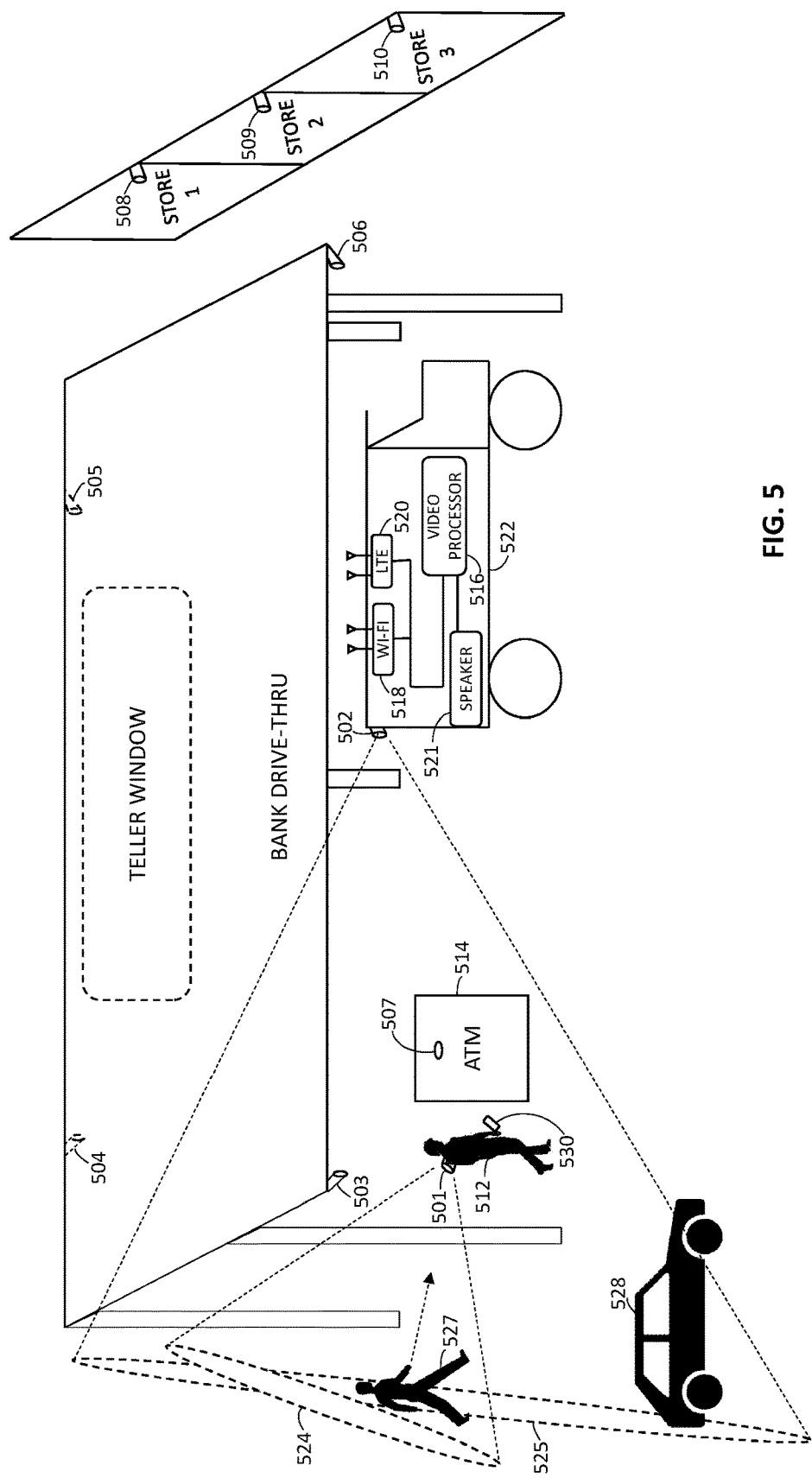
FIG. 5 illustrates an exemplary use case for the processes and system of FIGS. 1-4.
Figure 6:
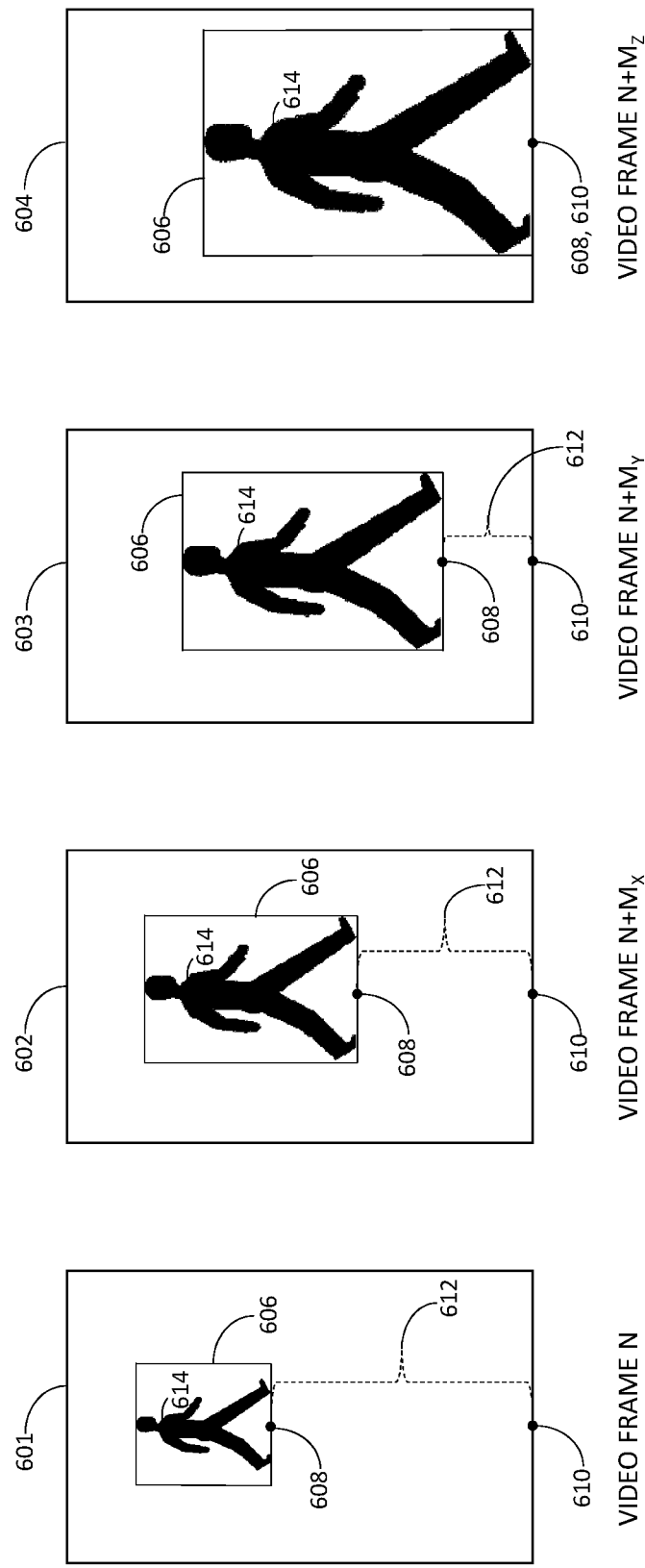
FIG. 6 illustrates an exemplary set of video frames received and analyzed by a video processing system while performing threat detection for the use case of FIG. 5.
Figure 7:
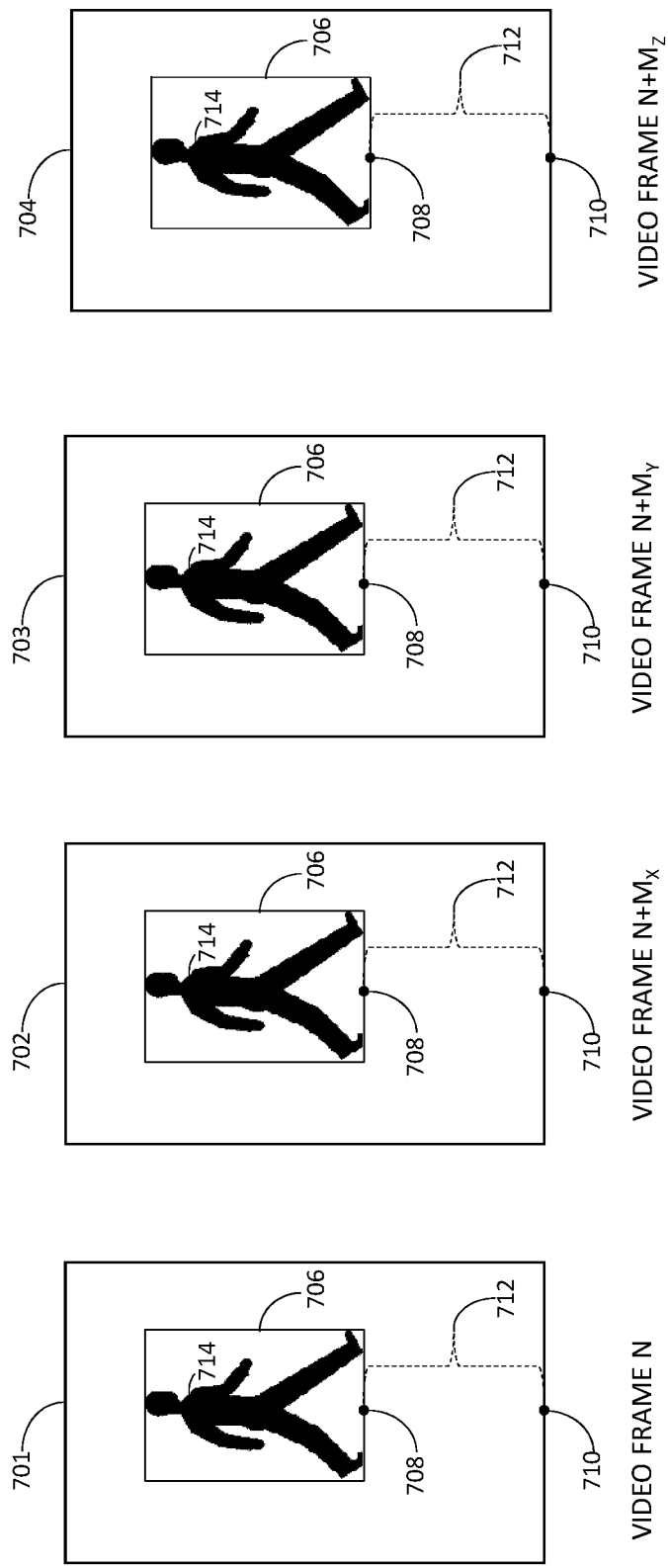
FIG. 7 illustrates an alternative exemplary set of video frames received and analyzed by a video processing system while performing threat detection for the use case of FIG. 5.

FIGS. 5-7 illustrate an exemplary use case for the processes and system of FIGS. 1-4. According to this exemplary scenario, a cash transport service employee 512 has driven into and parked in the automated teller machine (ATM) drive-thru lane of a bank. The vehicle 522 used to transport the employee 512 may be parked a few feet in front of the ATM 514 to be serviced, as generally shown in FIG. 5. In this particular situation, the video processing system may include a video processing apparatus and one or more cameras. Where the video processing system is a closed system, the cameras may include a camera 501 secured to the body of the employee 512 (e.g., as installed in or attached to a vest, jacket, shoulder harness or other item worn by the employee 512 while performing his job function) and one or more vehicle-mounted cameras 502 (one shown for illustration purposes). Where the video processing system is an open system capable of receiving and processing video data from third party video cameras, the cameras may further include a variety of cameras that may be positioned at or near the monitored location. Such cameras may include bank video surveillance cameras 503-506, an internal ATM camera 507, and video surveillance cameras 508-510 mounted outside nearby stores (e.g., of a nearby strip mall).

The video processing apparatus in the exemplary scenario of FIG. 5 may include a video processor 516 and a communication interface. The communication interface may include a short-range wireless interface, such as a Wi-Fi interface 518, and/or a wide-area wireless interface, such as a 4G LTE interface 520. The Wi-Fi interface 518 may be used to communicate video data and control signaling between the video processor 516 and the cameras 501-510 used in the particular implementation of the system, as well as between the video processor 516 and a wireless communication device 530 (e.g., smartphone) carried by the employee 512 (where such device 530 is used to provide threat alerts and/or related video to the employee 512). The LTE interface 520 may be similarly used to communicate video data and control signaling between the video processor 516 and the body-mounted camera 501, the vehicle-mounted camera 502, and/or a wireless communication device 530, but may be further used to communicate video data and other information between the video processor 516 (and/or the cameras 501, 502) and one or more remote devices, such as a remote control center for the cash transport service company, a law enforcement emergency response center, a cloud storage service, and/or any other remote device that may interface with the video processing system.

The video processing system may further include or be connected to a local alerting mechanism, such as a speaker 521. The alerting mechanism may be controlled by the video processor 516 to alert (e.g., audibly alert in the case of speaker 521) the employee 512 of a potential threat. In the embodiment illustrated in FIG. 5, the video processing apparatus is located entirely within the employee's transport vehicle 522. In an alternative embodiment, the video processing apparatus and/or its function may be distributed, such that some or all of the video processor function is performed by one of more server instances in a cloud server. An exemplary architecture for a cloud-based implementation of the video processor 110, 516 is described below with respect to FIG. 8.

For the sake of brevity and ease of understanding, operation of the video processing system in connection with the exemplary scenario illustrated in FIG. 5 will be limited to considering video images captured by the employee's body-mounted camera 501 and the vehicle-mounted camera 502. However, those of ordinary skill in the art will readily recognize and appreciate that the general principles of operation described below and otherwise herein may be applied to systems in which video and/or still images captured by other cameras 503-510 are considered in the threat determination process.

As shown in an exemplary manner in FIG. 5 by dashed conically-shaped patterns, the body-mounted camera 501 captures images in a first video capture area 524 and the vehicle-mounted camera 502 captures images in a second video capture area 525. Each video capture area 524, 525 is defined by the particular characteristics of its respective camera 501, 502. As shown in FIG. 5, each video capture area 524, 525 includes an area that is proximate the employee 512, who is the person under surveillance in this example. The video capture area 525 of the vehicle-mounted camera 502 includes the employee 512; whereas, the video capture area 524 of the body-mounted camera 501 is basically from the employee's viewing perspective in the direction and field of view of the camera 501.

In the exemplary scenario depicted in FIG. 5, two potential threats to the employee 512 are shown for illustrative purposes. The first potential threat is a person 527 who is walking in the general direction illustrated by the dashed arrow originating from the person 527. The second potential threat is a parked car 528 positioned generally near the location of the employee 512.

After the video processing system has been activated, each camera 501, 502 begins capturing images from its respective video capture area 524, 525 and communicating video data representing time-sequenced video frames to the video processor 516. The video data may include metadata, such as time stamps (e.g., where each video camera 501, 502 includes a global positioning satellite (GPS) unit or other accurate time source), or other information based upon which the video frames from each camera 501, 502 can be time-synchronized. The video processor 516 receives the video data from the cameras 501, 502 in real time or near real time using a streaming control protocol, such as RTSP, to control the streams of video data from the two cameras 501, 502. The video processor 516 analyzes the video data in each video frame from each camera 501, 502 to determine whether the video frame data includes data representative of one or more potential threat patterns. The set of potential threat patterns may be stored in memory of, or otherwise accessible to, the video processor 516. To determine whether a video frame received from a camera 501, 502 includes a potential threat pattern, the video processor 516 may compare the video frame data to the previously stored data representative of the set of potential threat patterns. The set of potential threat patterns may include, for example, the outline or other features of a human body or a portion thereof, the outline or other features of one or more predetermined objects (such as a firearm, knife, bat, club, TASER, or other object that could be used as a weapon), and/or the outline or other features of a vehicle. The video processor 516 may be programmed to update and/or expand the stored potential threat pattern data by applying machine learning techniques, such as supervised learning techniques (e.g., classification and/or regression algorithms), unsupervised learning techniques (e.g., association, clustering, and/or dimensionality reduction algorithms), and/or reinforcement learning techniques, to video data received by the video processor 516 from the system's cameras 501, 502 over time.

When the video processor 516 has determined that at least a portion of the video frame data includes data substantially similar to stored data representative of one or more potential threat patterns, the video processor 516 may determine that the video frame data includes potential threat pattern data. As discussed above with respect to FIG. 2, the video processor 516 may determine video data is substantially similar to potential threat pattern data where the video data has at least a fifty percent (50%) correspondence with data for a particular potential threat pattern within the set of potential threat patterns. In an alternative embodiment, the video processor 516 may determine whether the video frame data includes potential threat pattern data or other predefined pattern data by comparing combinations of position and velocity vectors for multiple simultaneously-tracked patterns to prestored reference combinations of position and velocity vectors and assigning a threat probability for each tracked pattern based on the degree of correspondence between the combination of position and velocity vector for the tracked pattern and one or more prestored reference combinations of position and velocity vectors.

When the video processor 516 has determined that at least a portion of the video frame data includes data representative of one or more potential threat patterns, the video processor 516 commences tracking of such pattern or patterns within the video data received from the cameras 501, 502. Pattern tracking may be performed on a video frame-by-video frame basis or on any other periodic or aperiodic basis (e.g., every other video frame, every fifth video frame, every third video frame during daylight hours, but every video frame during nighttime hours, and so forth). According to one exemplary embodiment, the video processor 516 may define a bounding area for each tracked pattern and initiate tracking to monitor for changes to the tracked pattern bounding area over time, especially within each camera's video capture area. For example, once a tracked pattern is detected in video data representing a video frame, the video processor 516 may position a shape as a boundary around the tracked pattern to form a trackable area for purposes of reducing the amount of processing resources necessary to track the pattern and its positioning relative to the employee 512. In other words, when a particular predefined pattern has been detected within a video frame, the pattern may be "bounded" within a reference area to make evaluating the pattern's positioning over multiple video frames and the potential threat to the employee 512 less processing intensive.

Pattern tracking may be commenced immediately upon detecting that video frame data includes data representative of one or more potential threat patterns or pattern tracking may be commenced selectively, such as only when certain other conditions are met. For example, the video processor 516 may use characteristics of the bounding area as a basis for deciding whether or not to initiate and perform pattern tracking. In such a case, the bounding area characteristics based upon which the video processor 516 may decide to initiate and perform pattern tracking include the size of the bounding area, the proximity of one or more points within the bounding area or on one or more of its edges to a location of the employee 512, and/or the presence of one or more other potential threat patterns in or near the bounding area. For example, the video processor 516 may determine a location of the tracked pattern bounding area (e.g., within or along an edge of the tracked pattern bounding area) relative to a location of the employee 512 and selectively initiate pattern tracking only when the location of the tracked pattern bounding area is estimated to be within a threshold distance (e.g., within about 45 feet or 14 meters) of the location of the employee 512. As another example, the video processor 516 may determine bounding areas of multiple tracked patterns (e.g., tracked patterns for a vehicle 528 and one or more persons 527) within the video frame data of the cameras 501, 502 and selectively initiate pattern tracking only when the location of the tracked pattern bounding areas for two or more of the tracked patterns are estimated to be within a threshold distance (e.g., about 15 feet or 5 meters) of one another.

After pattern tracking has been commenced, the video processor 516 determines whether data representing one or more subsequent video frames includes data representative of the tracked pattern or patterns. In other words, after pattern tracking has commenced, the video processor 516 analyzes some or all of the data representing video frames subsequent in time to the video frame that triggered the tracking to determine whether such data includes any tracked pattern or patterns. Such analysis may include comparing some or all of the video data representative of a subsequent video frame to previously stored data representative of one or more stored potential threat patterns or comparing some or all of the video data representative of a subsequent video frame to data representative of a potential threat pattern detected in a prior video frame. According to one exemplary embodiment, the video processor 516 analyzes video frame data on a periodic basis after pattern tracking has commenced. For example, the video processor 516 may analyze data representing ten consecutive video frames where the camera 501, 502 supplying the video data is capturing images at a rate of thirty frames per second (30 fps). In such a case, the video processor 516 analyzes every 333 milliseconds of video data to determine whether such data includes the tracked pattern(s) after pattern tracking has commenced. As another example, the video processing system may analyze data representing fifteen consecutive video frames where the camera 501, 502 supplying the video data is capturing images at a rate of sixty frames per second (60 fps). In this particular case, the video processor 516 may analyze every 250 milliseconds of video data to determine whether such data includes the tracked pattern(s) after pattern tracking has been commenced. The quantity of video frames analyzed by the video processing system may be selected based on several factors, including camera video quality, location and/or size of video capture area, positioning of the person within the video capture area, quantity and type of physical and natural structures in or near the video capture area, and so forth.

When data representing one or more subsequent video frames includes data representative of the tracked pattern or patterns, the video processor 516 determines whether the tracked pattern or patterns are positioned suspiciously relative to the employee 512. According to one exemplary embodiment, the video processor 516 may determine whether the analyzed data includes data indicative of movement of the tracked pattern or patterns (or their respective bounding areas) in a potentially threatening manner relative to the employee 512. For example, the video processor 516 may compare the size and positioning one or more tracked patterns in one subsequent video frame to data representative of the same tracked pattern or patterns in one or more other subsequent video frames. According to one embodiment, the video processor 516 may set the position of the employee 512 as a reference origin for images captured by either or both cameras 501, 502. The video processor 516 may then determine whether the tracked pattern bounding area is becoming larger and/or closer to a bottom of each image in the analyzed subsequent video frames based upon the data representing the subsequent video frames. When the tracked pattern bounding area is becoming larger and/or closer to a bottom of each image in the subsequent video frames, the video processor may determine that the tracked pattern is positioned suspiciously relative to the position of the employee 512 or other person under surveillance.

FIG. 6 provides an illustration for how the video processor 516 may analyze a set of video frames to initiate and continue pattern tracking. According to this embodiment, the video processor 516 receives streaming video data from a camera (e.g., camera 501) and extracts therefrom data representing a video frame 601 (e.g., Video Frame N in FIG. 6). The video processor 516 compares the video frame data to data representing a set of potential threat patterns. In the illustrated case, the set of potential threat patterns includes one or more patterns for a person 527 and the video processor 516 determines that the outline of a person 527 is substantially similar to a stored potential threat pattern 614. In response to such determination, the video processor 516 defines a bounding area 606 for the detected pattern 614 by overlaying the pattern 614 with a simpler geometric shape (e.g., a rectangle in this particular case).

According to one exemplary embodiment, the video processor 516 may commence pattern tracking upon defining the tracked pattern bounding area 606. According to another exemplary embodiment, the video processor 516 may determine a location of the tracked pattern bounding area 606 relative to a location of the employee 512 and then initiate pattern tracking when the location of the tracked pattern bounding area 606 is estimated to be within a threshold distance of the location of the employee 512. To determine the distance between the tracked pattern bounding area 606 and the employee 512, the video processor 516 may set the position of the employee 512 or other person under surveillance as the reference origin for the images captured by the camera 501 and determine a pixel or other distance 612 between a point or pixel coordinate 608 on an edge (e.g., bottom edge) of the bounding area 606 and a corresponding point or coordinate 610 along an edge (e.g., bottom edge) of the video frame 601. When the determined distance 612 is less than a predefined threshold distance (e.g., a pixel distance that equates to an actual, physical distance of less than about 100 feet or about 30 meters, or such other distance as may be defined by the system operator), the video processor 516 may commence pattern tracking.

According to the embodiment illustrated in FIG. 6, the video processor 516 may set the position of the employee 512 or other person under surveillance as the reference origin for images captured by the camera 501, if the video processor 516 hasn't already done so when determining whether to commence pattern tracking. Setting the position of the employee 512 or other person under surveillance as the reference origin provides a point of view for the video processor 516 to assess the potential threat of the tracked pattern's subject to the employee 512. To evaluate the potential threat, the video processor 516 may monitor the size of the tracked pattern bounding area 606 over a set of video frames 602-604 that are subsequent in time to the video frame 601 that resulted in commencement of pattern tracking (three video frames 602-604 are shown in the set of subsequent video frames for illustration, but the set may include ten or more video frames as described above). The set of subsequent video frames 602-604 over which a tracked pattern is analyzed may be sequential in nature (e.g., using the nomenclature from FIG. 6, $M_y$ may equal $M_{x+1}$ and $M_z$ may equal $M_{y+1}$) or may be otherwise selected over the tracking time period (e.g., $M_y$ may equal $M_{x+2}$, $M_z$ may equal $M_{y+3}$, and so forth based on how the frames to be analyzed are selected).

When the size of the tracked pattern bounding area 606 becomes larger over the set of subsequent video frames 602-604 (e.g., as illustrated in FIG. 6), the video processor 516 may determine that the tracked pattern 614 is approaching the employee 512 and, therefore, is positioned suspiciously relative to the employee 512. To determine whether the tracked pattern bounding area 606 is becoming larger over several video frames, the video processor 516 may use statistical processing to analyze the measured bounding area sizes. For example, the video processor 516 may determine a linear regression from the bounding area size data to represent how the size of the tracked pattern bounding area 606 changes across the set of subsequent video frames 602-604. The video processor 516 may then determine a gradient for the linear regression and compare the gradient to a threshold. For example, in the context of a potentially threatening person approaching the employee 512, the gradient threshold may be set in the range of 0.040 and 0.060, which equates to a 4.0% to 6.0% increase in boundary area size per second. When the gradient is greater than its threshold, the video processor 516 determines that the tracked pattern bounding area 606 is becoming larger over the set of subsequent video frames 602-604.

Additionally or alternatively, the video processor 516 may be programmed to determine whether the tracked pattern bounding area 606 is becoming closer to a bottom of each image in the subsequent set of video frames 602-604. Where the position of the employee 512 or other person under surveillance is set as the reference origin for images captured by the camera 501, movement of the tracked pattern 614 toward the bottom of the image over multiple video frames indicates that the tracked pattern 614 is approaching the person under surveillance (e.g., employee 512) and, therefore, may be a potential threat to the person under surveillance. According to this embodiment, the video processor 516 determines a position of a coordinate 608 along a bottom edge of the tracked pattern bounding area 606 and a relationship between the position of the coordinate 608 along the bottom edge of the tracked pattern bounding area 606 and the reference origin for each video frame 601-604 being analyzed. In the example illustrated in FIG. 6, the relationship between the position of the coordinate 608 along the bottom edge of the tracked pattern bounding area 606 and the reference origin is a distance 612 (e.g., pixel distance) between the coordinate 608 along the bottom edge of the tracked pattern bounding area 606 and a coordinate 610 along the bottom edge of the image as defined by the dimensions of the video frame 601-604. For illustration purposes only, the coordinate 608 along the bottom edge of the tracked pattern bounding area 606 is approximately centered along the bottom edge of the tracked pattern bounding area 606 and the coordinate 610 along the bottom edge of the image is likewise centered along the bottom edge of the image.

To determine whether the tracked pattern bounding area 606 is becoming closer to the bottom of the image over the analyzed subsequent video frames 602-604, the video processor 516 may use statistical processing to analyze the change in relationship (e.g., distance) between the tracked pattern bounding area 606 and the bottom of each image. For example, the video processor 516 may determine a linear regression from the bounding area-to-reference image distance data to represent how the relationship between the position of the coordinate 608 along the bottom edge of the tracked pattern bounding area 606 and the reference origin changes across the set of subsequent video frames 602-604. The video processor 516 may then determine a gradient for the linear regression and compare the gradient to a threshold. For example, in the context of a potentially threatening person approaching the employee 512, the gradient threshold may be set in the range of 0.010 and 0.020, which equates to a 1% to 2% decrease in distance per second. When the gradient is greater than its threshold, the video processor 516 determines that the tracked pattern bounding area 606 is becoming closer to the bottom of each image (and, therefore, closer to the reference origin) over the set of subsequent video frames 602-604. The video processor 110, 516 may analyze bounding area size changes, bounding area positioning relative to a reference origin or other reference point, both bounding area size changes and bounding area positioning, and/or any other video data-based characteristics to make its final determination as to whether a tracked pattern is positioned suspiciously relative to a position of the person under surveillance.

According to another exemplary embodiment, the video processor 516 may compare data representative of a tracked pattern 614 in one set of subsequent video frames 602, 603 to data representative of the tracked pattern 614 in another, later-in-time set of subsequent video frames 603, 604. Responsive to such comparison, the video processor 516 may determine one or more motion vectors that represent movement of the tracked pattern 614 over time. Thereafter, the video processor 516 may determine, based on the motion vector or vectors, whether the tracked pattern 614 is moving generally toward the person under surveillance (e.g., employee 512). When the tracked pattern 614 is moving generally toward the employee 512, the video processor 516 may determine a distance between the tracked pattern 614 and the employee 512. When the determined distance is less than a threshold, the video processor 516 may determine that video data representing the one or more subsequent video frames 602-604 includes data indicative of movement of the tracked pattern 614 in a potentially threatening manner relative to the employee 512. To assess whether the tracked pattern 614 is moving generally toward the employee 512, the video processor 516 may determine whether the tracked pattern 614 is moving directly toward the employee 512 or toward a position that is close enough to the employee 512 to pose a threat to the employee 512 depending on, for example, the details of the tracked pattern 614, or is moving on a path that will, with a high probability, intersect with or be in close proximity to a path of the employee 512.

According to another exemplary embodiment, the video processor 516 may receive motion data associated with the employee 512 or other person under surveillance, where the motion data is time-synchronized with the video data. For example, the motion data may be received from the employee's body camera 501, such as from one or more motion sensors (e.g., accelerometer, gyroscope, global positioning system (GPS), or other sensors) embedded within the camera 501, or from a mobile device 530 carried by the employee 512 (e.g., from a smartphone running a mobile application that is time-synchronized with the employee's body camera 501). Where the motion data is supplied by the employee's body camera 501, the motion data may be received by the video processor 516 as metadata within the video data stream from the camera 501.

Where motion data for the employee 512 or other person under surveillance is received in addition to video data, the video processor 516 may use the motion data to assist with determining whether one or more tracked patterns are positioned suspiciously relative to the employee 512 or other person under surveillance. In such a case, when the video processor 516 determines that the employee 512 is in motion, the video processor 516 may further determine, based on video data over multiple video frames, whether the tracked pattern 614 is becoming substantially smaller in size (e.g., at least twenty-five percent smaller over one or more video frames) or is no longer present in the video capture area 524. When the employee 512 is in motion and the tracked pattern 614 is not becoming substantially smaller in size and/or remains present in the video capture area 524, the video processor 516 may determine that the tracked pattern 614 is positioned suspiciously relative to the position of the employee 512. For example, not having the tracked pattern 614 become substantially smaller and/or having the tracked pattern 614 remain in the video capture area 524 could indicate that the person 527 represented by the tracked pattern 614 is following the employee 512 or other person under surveillance. Alternatively, when the employee 512 is in motion and the tracked pattern 614 is becoming substantially smaller in size or is no longer present in the video capture area 524, the video processor 516 may determine that the tracked pattern 614 is not positioned suspiciously relative to the position of the employee 512. According to one exemplary embodiment, the video processor 516 may be programmed to consider a decrease in the size of the tracked pattern 614 or the tracked pattern's bounding area 606 by at least twenty-five percent over the analyzed video frames 601-604 to indicate that the tracked pattern 614 is becoming substantially smaller in size for purposes of assessing whether the tracked pattern 614 is positioned suspiciously relative to the position of the employee 512.

FIG. 7 provides an illustration for how the video processor 516 may analyze a set of video frames 701-704 in connection with receipt of motion data associated with a person under surveillance (e.g., employee 512). According to this embodiment, the video processor 516 receives streaming video data from a camera (e.g., camera 501) and extracts therefrom data representing a video frame 701 (Video Frame N). The video data stream or metadata thereof may include motion data representing outputs from one or more motion sensors within the camera 501. For example, the motion data may have been inserted by the camera 501 into the video data stream through use of supplemental enhancement information (SEI) messages in accordance with the H.264 video codec (MPEG-4 Advanced Video Coding Part 10) standard. As detailed above with respect to FIG. 6, the video processor 516 compares the video frame data to stored data representing a set of potential threat patterns. In the illustrated case, the set of potential threat patterns includes one or more patterns for a person 527 and the video processor 516 determines that the outline of a person 527 is substantially similar to a stored potential threat pattern 714. In response to such determination, the video processor 516 defines a bounding area 706 for the detected pattern 714 by overlaying the pattern 714 with a simpler geometric shape (e.g., a rectangle in this particular case).

According to one exemplary embodiment, the video processor 516 may commence pattern tracking upon defining the tracked pattern bounding area 706. According to another exemplary embodiment, the video processor 516 may determine a location of the tracked pattern bounding area 706 relative to a location of the person under surveillance and then initiate pattern tracking when the location of the tracked pattern bounding area 706 is estimated to be within a threshold distance of the location of the person under surveillance. To determine the distance between the tracked pattern bounding area 706 and the person under surveillance, the video processor 516 may set the position of the person under surveillance as the reference origin for the images captured by the camera 501 and determine a pixel or other distance 712 between a point or pixel coordinate 708 on an edge (e.g., bottom edge) of the bounding area 706 and a corresponding point or coordinate 710 along an edge (e.g., bottom edge) of the image or video frame 701. When the determined distance 712 is less than a predefined threshold distance, the video processor 516 may commence pattern tracking.

According to the embodiment illustrated in FIG. 7, the video processor 516 may set the position of the person under surveillance as the reference origin for images captured by the camera supplying the video data (e.g., body camera 501), if the video processor 516 hasn't already done so when determining whether to commence pattern tracking. To evaluate a potential threat, the video processor 516 may monitor the size of the tracked pattern bounding area 706 over a set of video frames 702-704 that are subsequent in time to the video frame 701 that resulted in commencement of pattern tracking (three video frames 702-704 are shown in the set of subsequent video frames for illustration, but the set may include ten or more video frames as described above). The set of subsequent video frames 702-704 over which a tracked pattern is analyzed may be sequential in nature (e.g., using the nomenclature from FIG. 7, $M_y$ may equal $M_{x+1}$ and $M_z$ may equal $M_{y+1}$) or may be otherwise selected over the tracking time period (e.g., $M_y$ may equal $M_{x+2}$, $M_z$ may equal $M_{y+3}$, and so forth based on how the frames to be analyzed are selected).

When the video processor 516 determines from the motion data that the person under surveillance is in motion (e.g., walking) and further determines from analyzing the data representing the set of subsequent video frames 702-704 that the size of the tracked pattern bounding area 706 is becoming substantially smaller in size or that the tracked pattern 714 is no longer present in the video captured from the camera's video capture area 524, the video processor 516 may determine that the tracked pattern 714 is not positioned suspiciously relative to the person under surveillance. On the other hand, when the video processor 516 determines from the motion data that the person under surveillance is in motion and further determines from analyzing the data representing the set of subsequent video frames 702-704 that the size of the tracked pattern bounding area 706 is not becoming substantially smaller in size and that the tracked pattern 714 remains present in the video captured from the camera's video capture area 524, the video processor 516 may determine that the tracked pattern 714 is positioned suspiciously relative to the person under surveillance.

In an alternative embodiment, the video processor 516 may analyze the distance 712 between the tracked pattern 714 or its associated bounding area 706 and a bottom of the video frame image across the analyzed set of video frames 701-704. To determine the distance between the tracked pattern bounding area 706 and the person under surveillance (e.g., employee 512), the video processor 516 may set the position of the person under surveillance as the reference origin for the images captured by the camera 501 and determine a pixel or other distance 712 between a point or pixel coordinate 708 on an edge (e.g., bottom edge) of the bounding area 706 and a corresponding point or coordinate 710 along an edge (e.g., bottom edge) of the image or video frame 701. When the video processor 516 determines from the motion data that the person under surveillance is in motion and further determines from analyzing the data representing the set of subsequent video frames 702-704 that the distance 712 between the bottom edge coordinate 708 of the tracked pattern bounding area 706 and the bottom edge coordinate 710 of the video frame 702-704 is increasing, the video processor 516 may determine that the tracked pattern 714 is not positioned suspiciously relative to the person under surveillance. On the other hand, when the video processor 516 determines from the motion data that the person under surveillance is in motion and further determines from analyzing the data representing the set of subsequent video frames 702-704 that the distance 712 between the bottom edge coordinate 708 of the tracked pattern bounding area 706 and the bottom edge coordinate 710 of the video frame 702-704 is decreasing or remaining substantially unchanged, the video processor 516 may determine that the tracked pattern 714 is positioned suspiciously relative to the person under surveillance. As described above with respect to FIG. 6, the change in distance 712 from the bounding area edge to the frame/image edge may be used alone or together with the change in the size of the bounding area 706 to determine whether the tracked pattern 714 is positioned suspiciously relative to the person under surveillance when the person under surveillance is in motion.

The exemplary set of video frames 701-704 depicted in FIG. 7 show one example where the size of the bounding area 706 remains substantially unchanged over the analyzed set of video frames 701-704. As a result, where the motion data associated with the person under surveillance indicates that the person under surveillance is in motion, the video data in combination with the motion data indicate to the video processor 516 that the person 527 represented by the tracked pattern 714 may be following the person under surveillance and that the tracked pattern 714 is, therefore, positioned suspiciously relative to the person under surveillance.

The exemplary set of video frames 701-704 depicted in FIG. 7 also show one example where the distance 712 between the bottom edge coordinate 708 of the tracked pattern bounding area 706 and the bottom edge coordinate 710 of the video frame 702-704 remains substantially unchanged. As a result, where the motion data associated with the person under surveillance indicates that the person under surveillance is in motion, the video data in combination with the motion data indicate to the video processor 516 that the person 527 represented by the tracked pattern 714 may be following the person under surveillance and that the tracked pattern 714 is, therefore, positioned suspiciously relative to the person under surveillance.

After one or more tracked patterns 614, 714 have been determined to be positioned suspiciously relative to the position of the person under surveillance (e.g., employee 512), the video processor 516 may alert the person under surveillance of a potential threat. For example, the video processor 516 may communicate a message to an application executing on the employee's wireless communication device 530, where the message causes the application to activate an audible alarm and/or a haptic alarm of the wireless communication device 530. Alternatively, the video processor 516 may communicate at least some of the video data to a video processing and display application executing on the employee's wireless communication device 530. Such video data may include static images, a video stream, or both to enable the employee 512 to independently analyze any potential threat. Alternatively, when a tracked pattern bounding area 606, 706 is defined for a tracked pattern 614, 714, the video data communicated to the employee's wireless device 530 may be augmented with data representing at least one overlay for the tracked pattern bounding area 606, 706. For example, when a rectangular bounding area 606, 706 is defined for the tracked pattern 614, 714, the video data communicated to the employee's wireless device 530 may be augmented with data representing a rectangle overlay positioned over the tracked pattern 614, 714 so as to visibly indicate the tracked pattern bounding area 606, 706 to the employee 512.

Figure 8:
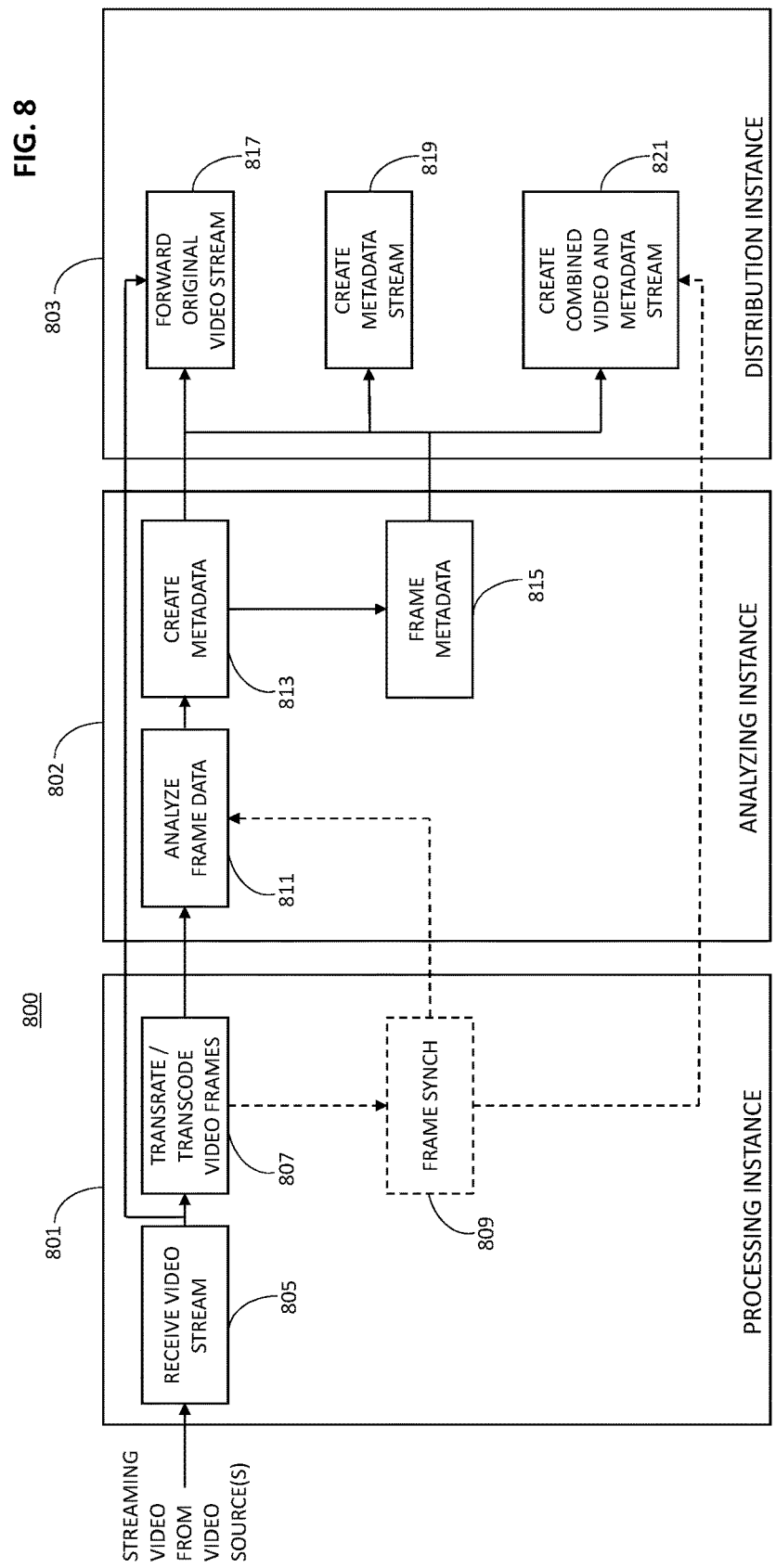
FIG. 8 is a block diagram illustrating a cloud-based architecture for implementing a threat detection method based on real-time or near real-time video analysis, in accordance with a further exemplary embodiment of the present disclosure.

FIG. 8 is a block diagram illustrating a cloud-based architecture 800 for implementing a threat detection method based on real-time or near real-time video analysis, in accordance with a further exemplary embodiment of the present disclosure. The exemplary cloud architecture 800 may include or utilize multiple cloud server instances, including, for example, a processing instance 801, an analyzing instance 802, and a distribution instance 803. The processing instance 801 includes software modules that operate to, inter alia, receive (805) streaming video from the video sources (e.g., cameras), transrate and/or transcode (807) the video frames of the video stream, and optionally perform frame synchronization (809) by, for example, determining frame timing from the received video data and supplying frame synchronization signals to various functions within the analyzing instance 802 and the distribution instance 803. The frame synchronization function (809) may be necessary for video streams, such as MJPEG streams, that do not provide timing themselves. The frame synchronization function (809) is unnecessary for video streams, such as MPEG-4 and H.264 streams, that include video frame presentation time information in their respective container or wrapper formats.

The analyzing instance 802 includes software modules that operate to, inter alia, analyze (811) the video frame data in real time or near real time to determine whether the video frame data includes one or more stored patterns and, if so, track the pattern or patterns over a set of subsequent video frames in the video stream. The analyzing instance 802 may also include software modules to create (813) metadata that may be individually accessible or that may be included with or accompany the video stream. Once created, metadata may be stored in a database together with the presentation time and the video stream identifier of the video frame and video stream to which the metadata respectively relates. At the time of distribution by the distribution instance 803, the analyzing instance 802 may arrange (815) the created metadata into a frame structure that mirrors the frame structure of the video data stream to be forwarded to an end user. Frame synchronization for analyzing the video frame data may also be provided, when necessary, from the frame synchronization function (809) executing in the processing instance 801.

The distribution instance 803 includes software modules that operate to, inter alia, forward (817) the originally-received video stream to a requesting client application, create (819) and communicate to the client application a metadata stream for use by the client application to augment the original video stream, or create (821) and communicate to the client application a combined video and metadata stream that already includes the tracked pattern bounding area overlaid upon the original video stream. Where the metadata is integrated into a combined video and metadata stream, the metadata may be inserted into the video stream as SEI messages when the video data stream is created according to the H.264 video codec. Frame synchronization for creating the metadata stream and/or the combined video and metadata stream may be provided, when necessary, from the frame synchronization function (809) executing in the processing instance 801. The client application to which the video and/or metadata stream is sent may be, for example, a mobile application running on the monitored person's wireless device 530, an enterprise or other software application running on a server/computer at a surveillance monitoring location, an Internet application (e.g., a media player), a web browser, or any other software program that permits viewing videos.

To implement the cloud-based architecture 800 of FIG. 8 according to one exemplary embodiment, a video streaming engine (such as the commercially-available WOWZA video streaming engine) and an object detection process (such as the commercially-available YOLO object detection system) may be run simultaneously on cloud server instances provided through a web services company, such as Amazon Web Services, Inc. ("AWS"). In such a case, the video streaming engine receives (805) one or more video streams from one or more cameras 101-104, 501-510 over the Internet. To achieve low latency in furtherance of performing real-time or near real-time video processing, the cameras used in the video processing system may use the Real-Time Messaging Protocol (RTMP), which is an open specification from Adobe Systems Incorporated, to transmit their video streams to the cloud-based processing instance 801. The video streaming engine transrates (807) each video stream and runs the object detection process on it. The object detection process analyzes (811) each video frame of the video stream and detects any pre-stored patterns in the video frame. Once a pattern is detected, the detected pattern may be tracked by running a thread detection algorithm over a set of subsequent video frames (e.g., a set of 10-20 consecutive video frames following or including the video frame in which the pattern was originally detected). Based on the results of the thread detection algorithm, metadata may be created (813) to facilitate placement of a geometrically-shaped overlay over the tracked pattern to form a tracked pattern bounding area. The metadata may contain the type of geometric shape, positioning of the shape in the video frame, a class name for the tracked pattern (e.g., person, car, weapon, etc.), and a probability that such pattern was accurately detected. The video streaming engine may then create (819, 821) a metadata stream and/or a combined video and metadata stream (video stream augmented with the tracked pattern overlay) and provide (817, 821, 823) the original video stream, the metadata stream, and/or the combined video and metadata stream to one or more client applications via the Internet.

The cloud-based architecture 800 illustrated in FIG. 8 or another similarly-configured architecture may be also or alternatively used to perform video post-processing of one or more videos previously recorded by one or more cameras 101-104, 501-510. In such a case, the recorded video files may be uploaded to a storage unit or bucket of a cloud storage service, such as the AWS S3 service. After uploading has been completed, a compute service, such as the AWS LAMBDA service, may be automatically or manually triggered to run a processing script on the processing instance 801. The processing script downloads the video files (video data) from the cloud storage service into local storage of the cloud server. The video data may then be processed in the same manner as described above with respect to processing of streaming video to ultimately create overlay metadata associated with a video frame or a series of video frames in the processed video data. The created metadata may be stored in a separate file or new videos may be created based on the metadata and the original video data. When created, such new video files may be uploaded to the cloud storage service (e.g., into a new storage unit, such a new AWS S3 bucket) and the original video files may be deleted from the local storage of the cloud server. One exemplary reason to use cloud-based video post-processing may be to generate a highlight or summation video from videos captured by different cameras 101-104, 501-510 so as to enable a pattern to be tracked from different viewing angles.

The present disclosure describes automated, human intervention-less, video analysis-based threat detection systems and methods. With such systems and methods, video data may be analyzed locally or in the cloud to determine, in real time or near real time, the presence of a potential threat to a person located in or proximate to the video capture area(s) of camera(s) that produced the analyzed video data. Where a potential threat is detected, the systems and methods may alert the person under surveillance in real time or near real time to give the person an opportunity to take defensive action. The systems and methods may also forward the received videos, as optionally augmented to include overlays highlighting the pattern or patterns being tracked as potential threats, to security or emergency personnel so as to enable such personnel to promptly respond to a potential threat. The systems and methods described herein are particularly, though not exclusively, advantageous for enhancing the protection of persons involved in providing cash management or transport services, package delivery services, and other services that are provided in a mobile manner and have a higher than normal risk of being subject to criminal activity.

As detailed above, embodiments of the disclosed systems and methods reside primarily in combinations of method steps and apparatus components related to detecting potential threats to persons based on real-time or near real-time video analysis. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this document, the drawings, and the appended claims, relational terms such as "first" and "second," "top" and "bottom," and the like may be used solely to distinguish one entity or action from another entity or action without necessarily requiring or implying any actual such relationship or order between such entities or actions. The terms "comprises," "comprising," "includes," "including," "has," "having," "contains," "containing," and any other variations thereof are intended to cover a non-exclusive inclusion, such that a process, method, article, apparatus, or system that comprises, includes, has, or contains a list of elements, characteristics, or features does not include only those elements but may include other elements not expressly listed or inherent to such process, method, article, apparatus, or system. The term "plurality of" as used in connection with any object or action means two or more of such object or action. A claim element proceeded by the article "a" or "an" does not, without more constraints, preclude the existence of additional identical elements in the process, method, article, apparatus, or system that includes the element.

In the foregoing specification, specific embodiments of the claimed invention have been described. However, one of ordinary skill in the art will appreciate that various modifications and changes can be made without departing from the scope of the present invention as set forth in the appended claims. Accordingly, the specification and figures are to be regarded in an illustrative rather than a restrictive sense, and all such modifications are intended to be included within the scope of claimed invention. For example, it is expected that one of ordinary skill in the art, notwithstanding possibly significant effort and many design choices motivated by, for example, available time, current technology, and economic considerations, when guided by the concepts and principles disclosed herein will be readily capable of generating software instructions or programs and configuring integrated circuits and other hardware to implement the methods and systems recited in the appended claims without undue experimentation. The benefits, advantages, solutions to problems, and any element(s) that may cause any benefit, advantage, or solution to occur or become more pronounced are not to be construed as critical, required, or essential features or elements of any or all the claims. The present invention is defined solely by the appended claims including any amendments made during the pendency of this application and all equivalents of those claims as issued.

What is claimed is:

1. A method for detecting a threat to a person, the method comprising:

receiving, by a video processing system, video data in real time or near real time from at least one camera, the video data including data representing a plurality of time-sequenced video frames, the at least one camera capturing images of a video capture area proximate the person;

responsive to receiving the video data, determining, by the video processing system from the video data, whether data representing a first video frame of the plurality of video frames includes data representative of one or more predefined patterns;

when a determination has been made that at least a portion of the data representing the first video frame includes data representative of one or more predefined patterns, commencing, by the video processing system, tracking of the one or more predefined patterns within the video data to produce one or more tracked patterns;

subsequent to commencing tracking of the one or more predefined patterns, determining, by the video processing system, whether data representing one or more subsequent video frames of the plurality of video frames includes data representative of the one or more tracked patterns;

when a determination has been made that at least a portion of the data representing the one or more subsequent video frames includes data representative of the one or more tracked patterns, determining, by the video processing system based on the data representing the one or more subsequent video frames and the data representative of the one or more tracked patterns, whether the one or more tracked patterns are positioned suspiciously relative to a position of the person; and when a determination has been made that the one or more tracked are positioned suspiciously relative to a position of the person, alerting, by at least the video processing system, the person.

2. The method of claim 1, wherein the at least one camera includes a camera secured to a body of the person.

3. The method of claim 1, wherein the at least one camera includes a plurality of cameras, wherein a first camera of the plurality of cameras is secured to a body of the person, and wherein at least a second camera of the plurality of cameras is secured to a motor vehicle.

4. The method of claim 1, wherein the one or more predefined patterns include features of a human body.

5. The method of claim 1, wherein the one or more predefined patterns include features of one or more predetermined objects.

6. The method of claim 1, wherein alerting the person comprises:
communicating, by the video processing system, a message to an application executing on a wireless communication device carried by the person, the message causing the application to activate at least one of an audible alarm and a haptic alarm of the wireless communication device.

7. The method of claim 1, wherein alerting the person comprises:
communicating, by the video processing system, at least some of the video data to a video processing and display application executing on a wireless communication device carried by the person.

8. The method of claim 1, wherein determining whether video data representing the first video frame includes data representative of one or more predefined patterns comprises:
comparing, by the video processing system, the video data representing the first video frame to previously stored data representative of a set of potential threat patterns; and
determining that the video data representing the first video frame includes data representative of one or more predefined patterns when at least a portion of the video data representing the first video frame includes data substantially similar to data representative of one or more patterns in the set of potential threat patterns.

9. The method of claim 8, further comprising:
applying, by the video processing system, one or more machine learning techniques to update and expand, over time, the stored data representative of the set of potential threat patterns.

10. The method of claim 1, wherein determining whether the one or more tracked patterns are positioned suspiciously relative to a position of the person comprises:
determining, by the video processing system, whether the video data representing the one or more subsequent video frames includes data indicative of movement of the one or more tracked patterns in a potentially threatening manner relative to the person.

11. The method of claim 10, wherein determining whether the video data representing the one or more subsequent video frames includes data indicative of movement of the one or more tracked patterns in a potentially threatening manner relative to the person comprises:
comparing, by the video processing system, data representative of the one or more tracked patterns in one subsequent video frame to data representative of the one or more tracked patterns in another subsequent video frame on a video frame-by-video frame basis;
responsive to the comparing step, determining, by the video processing system, one or more motion vectors that represent movement of the one or more tracked patterns over time;
determining, by the video processing system, whether the one or more motion vectors are in a general direction of the person; and
when a determination has been made that the one or more motion vectors are in a general direction of the person, determining, by the video processing system, that the video data representing the one or more subsequent video frames includes data indicative of movement of the one or more tracked patterns in a potentially threatening manner relative to the person.

12. The method of claim 10, wherein determining whether the video data representing the one or more subsequent video frames includes data indicative of movement of the one or more tracked patterns in a potentially threatening manner relative to the person comprises:
comparing, by the video processing system, data representative of the one or more tracked patterns in one set of subsequent video frames to data representative of the one or more tracked patterns in another, later-in-time set of subsequent video frames;
responsive to the comparing step, determining, by the video processing system, one or more motion vectors that represent movement of the one or more tracked patterns over time;
determining, by the video processing system based upon the one or more motion vectors, whether the one or more tracked patterns are moving generally toward the person;
when a determination has been made that the one or more tracked patterns are moving generally toward the person, determining, by the video processing system based upon the one or more motion vectors, one or more distances between the one or more tracked patterns and the person; and
when a distance of the one or more distances is less than a threshold, determining, by the video processing system, that the video data representing the one or more subsequent video frames includes data indicative of movement of the one or more tracked patterns in a potentially threatening manner relative to the person.

13. The method of claim 1, further comprising:
receiving, by the video processing system, motion data associated with the person, wherein the motion data is time-synchronized with the video data; and
determining, by the video processing system based on the motion data, whether the person is in motion;
wherein determining whether the one or more tracked patterns are positioned suspiciously relative to a position of the person includes:
when a determination has been made that the person is in motion, determining, based on the data representing the one or more subsequent video frames, whether the one or more tracked patterns are becoming substantially smaller in size or are no longer present in the video capture area; and
when the one or more tracked patterns are not becoming substantially smaller in size and remain present in the video capture area, determining that the one or more tracked patterns are positioned suspiciously relative to the position of the person.

14. The method of claim 13, wherein the motion data is received from the at least one camera as metadata within the video data.

15. The method of claim 13, wherein the motion data is received from a mobile device carried by the person.

16. The method of claim 13, wherein determining whether the one or more tracked patterns are becoming substantially smaller in size comprises:
determining whether a size of a tracked pattern becomes at least twenty-five percent smaller over the one or more subsequent video frames.

17. The method of claim 1, wherein the video processing system executes a real-time streaming protocol to receive the video data from the at least one camera.

18. The method of claim 1, wherein commencing tracking of the one or more predefined patterns within the video data comprises:

defining, by the video processing system, a bounding area for a tracked pattern of the one or more tracked patterns to produce a tracked pattern bounding area; and initiating, by the video processing system, tracking to monitor for changes to the tracked pattern bounding area over time within the video capture area.

19. The method of claim 18, further comprising:

determining, by the video processing system, a location of the tracked pattern bounding area relative to a location of the person;

wherein tracking to monitor for changes to the tracked pattern bounding area over time is selectively initiated by the video processing system when the location of the tracked pattern bounding area is estimated to be within a threshold distance of the location of the person.

20. The method of claim 18, wherein determining whether the one or more tracked patterns are positioned suspiciously relative to a position of the person comprises:

setting, by the video processing system, the position of the person as a reference origin for the images captured by a camera of the at least one camera;

determining, by the video processing system, whether the tracked pattern bounding area is becoming at least one of larger and closer to a bottom of each image in the one or more subsequent video frames based upon the data representing the one or more subsequent video frames; and when the tracked pattern bounding area is becoming at least one of larger and closer to a bottom of each image in the one or more subsequent video frames, determining, by the video processing system, that the tracked pattern is positioned suspiciously relative to the position of the person.

21. The method of claim 20, wherein determining whether the tracked pattern bounding area is becoming larger in the one or more subsequent video frames comprises:

determining, by the video processing system based on data representing a set of subsequent video frames of the one or more subsequent video frames, a size of the tracked pattern bounding area in each video frame of the set of subsequent video frames to produce bounding area size data, wherein data representing each video frame of the set of subsequent video frames includes data representative of the tracked pattern;

determining, by the video processing system based on the bounding area size data, a linear regression to represent how the size of the tracked pattern bounding area changes across the set of subsequent video frames;

determining, by the video processing system, a gradient for the linear regression;

comparing, by the video processing system, the gradient to a threshold; and determining that the tracked pattern bounding area is becoming larger in the one or more subsequent video frames when the gradient is greater than the threshold.

22. The method of claim 21, wherein determining whether the tracked pattern bounding area is becoming closer to a bottom of each image in the one or more subsequent video frames comprises:

determining, by the video processing system based on the data representing the set of subsequent video frames, a position of a coordinate along a bottom edge of the tracked pattern bounding area in each video frame of the set of subsequent video frames to produce bottom coordinate position data;

determining, by the video processing system based on the bottom coordinate position data, a relationship between the position of the coordinate along the bottom edge of the tracked pattern bounding area and the reference origin for each video frame of the set of subsequent video frames to produce bottom coordinate relationship data;

determining, by the video processing system based on the bottom coordinate relationship data, a second linear regression to represent how the relationship between the position of the coordinate along the bottom edge of the tracked pattern bounding area and the reference origin changes across the set of subsequent video frames;

determining, by the video processing system, a second gradient for the second linear regression;

comparing, by the video processing system, the second gradient to a second threshold; and determining, by the video processing system, that the tracked pattern bounding area is becoming closer to a bottom of each image in the one or more subsequent video frames when the second gradient is greater than the second threshold.

23. The method of claim 20, wherein determining whether the tracked pattern bounding area is becoming closer to a bottom of each image in the one or more subsequent video frames comprises:

determining, by the video processing system based on data representing a set of subsequent video frames of the one or more subsequent video frames, a position of a coordinate along a bottom edge of the tracked pattern bounding area in each video frame of the set of subsequent video frames to produce bottom coordinate position data, wherein data representing each video frame of the set of subsequent video frames includes data representative of the tracked pattern;

determining, by the video processing system based on the bottom coordinate position data, a relationship between the position of the coordinate along the bottom edge of the tracked pattern bounding area and the reference origin for each video frame of the set of subsequent video frames to produce bottom coordinate relationship data;

determining, by the video processing system based on the bottom coordinate relationship data, a linear regression to represent how the relationship between the position of the coordinate along the bottom edge of the tracked pattern bounding area and the reference origin changes across the set of subsequent video frames;

determining, by the video processing system, a gradient for the linear regression;

comparing, by the video processing system, the gradient to a threshold; and determining, by the video processing system, that the tracked pattern bounding area is becoming closer to a bottom of each image in the one or more subsequent video frames when the gradient is greater than the threshold.

24. The method of claim 20, wherein alerting the person comprises:

communicating, by the video processing system to a video processing and display application executing on a wireless communication device possessed by the person, at least some of the video data as augmented with data representing at least one overlay for the tracked pattern bounding area.

25. The method of claim 20, further comprising:
receiving, by the video processing system, motion data associated with the person, wherein the motion data is time-synchronized with the video data; and
determining, by the video processing system based on the motion data, whether the person is in motion;
wherein determining whether the one or more tracked patterns are positioned suspiciously relative to a position of the person further includes:
when a determination is made that the person is in motion, determining whether the tracked pattern bounding area is becoming substantially smaller in the one or more subsequent video frames based upon the data representing the one or more subsequent video frames; and
when the tracked pattern bounding area is not becoming substantially smaller in the one or more subsequent video frames, determining that the tracked pattern is positioned suspiciously relative to the position of the person.

26. The method of claim 18, further comprising:
receiving, by the video processing system, motion data associated with the person, wherein the motion data is time-synchronized with the video data; and
determining, by the video processing system based on the motion data, whether the person is in motion;
wherein determining whether the one or more tracked patterns are positioned suspiciously relative to a position of the person further includes:
when a determination is made that the person is in motion, determining whether the tracked pattern bounding area is becoming substantially smaller in the one or more subsequent video frames based upon the data representing the one or more subsequent video frames; and
when the tracked pattern bounding area is not becoming substantially smaller in the one or more subsequent video frames, determining that the tracked pattern is positioned suspiciously relative to the position of the person.

27. The method of claim 26, wherein determining whether the tracked pattern bounding area is becoming substantially smaller comprises:
determining whether the tracked pattern bounding area becomes at least twenty-five percent smaller over the one or more subsequent video frames.

28. A method for detecting a threat to a person, the method comprising:
receiving, by a video processing system, video data in real time or near real time from at least two cameras to produce at least first video data and second video data, the first video data originating from a first camera of the at least two cameras and including data representing a first plurality of time-sequenced video frames, the second video data originating from a second camera of the at least two cameras and including data representing a second plurality of time-sequenced video frames, the first camera capturing images of a first video capture area that is proximate the person but excludes the person, the second camera capturing images of a second video capture area that is proximate the person and includes the person;
determining, by the video processing system from the first video data, whether data representing a first video frame of the first plurality of video frames includes data representative of one or more predefined patterns;
determining, by the video processing system from the second video data, whether data representing a first video frame of the second plurality of video frames includes data representative of the one or more predefined patterns and data representative of a pattern for the person;
when data representing the first video frame of the first plurality of video frames and data representing the first video frame of the second plurality of video frames are determined to include data representative of the one or more predefined patterns and when data representing the first video frame of the second plurality of video frames is determined to include the pattern for the person, commencing, by the video processing system, tracking of the one or more predefined patterns within the first video data and the second video data to produce one or more tracked patterns;
determining, by the video processing system, whether data representing one or more subsequent video frames of the first plurality of video frames and data representing one or more subsequent video frames of the second plurality of video frames include data representative of the one or more tracked patterns;
when data representing one or more subsequent video frames of the first plurality of video frames and data representing one or more subsequent video frames of the second plurality of video frames are determined to include data representative of the one or more tracked patterns, determining, by the video processing system based on the data representing the one or more subsequent video frames of the first plurality of video frames, the data representing the one or more subsequent video frames of the second plurality of video frames, and the data representative of the one or more tracked patterns, whether the one or more tracked patterns are positioned suspiciously relative to a position of the person; and
when the one or more tracked patterns are determined to be positioned suspiciously relative to a position of the person, alerting, by at least the video processing system, the person.

29. The method of claim 28, wherein determining whether the one or more tracked patterns are positioned suspiciously relative to a position of the person comprises:
determining, by the video processing system based on the data representing the one or more subsequent video frames of the plurality of video frames, the data representing the one or more subsequent video frames of the second plurality of video frames, and the data representative of the one or more tracked patterns, (a) a distance between the one or more tracked patterns and the person and (b) one or more motion vectors for the one or more tracked patterns relative to the position of the person; and
when the distance between the one or more tracked patterns and the person is determined to be less than a threshold and the one or more motion vectors are determined to be in a general direction of the position of the person, determining that the one or more tracked patterns are positioned suspiciously relative to the position of the person.

30. A system for detecting a threat to a person, the system comprising:
at least one camera positioned to capture images of a video capture area proximate the person; and
a video processing apparatus communicatively coupled to the at least one camera, the video processing apparatus including:

a communication interface operable to receive video data in real time or near real time from the at least one camera, the video data including data representing a plurality of time-sequenced video frames; and a video processor operably coupled to the communication interface and operable in accordance with a set of operating instructions to:

determine, from the video data, whether data representing a first video frame of the plurality of video frames includes data representative of one or more predefined patterns;

when at least a portion of the data representing the first video frame is determined to include data representative of one or more predefined patterns, commence tracking of the one or more predefined patterns within the video data to produce one or more tracked patterns;

determine, from the video data, whether data representing one or more subsequent video frames of the plurality of video frames includes data representative of the one or more tracked patterns;

when at least a portion of the data representing the one or more subsequent video frames is determined to include data representative of the one or more tracked patterns, determine, based on the data representing the one or more subsequent video frames and the data representative of the one or more tracked patterns, whether the one or more tracked patterns are positioned suspiciously relative to a position of the person; and when the one or more tracked patterns are determined to be positioned suspiciously relative to a position of the person, alert the person.

* * * * *